(12) United States Patent
Kawamura

(10) Patent No.: US 9,013,804 B2
(45) Date of Patent: Apr. 21, 2015

(54) ZOOM LENS AND IMAGING APPARATUS

(71) Applicant: FUJIFILM Corporation, Tokyo (JP)

(72) Inventor: Daiki Kawamura, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/138,816

(22) Filed: Dec. 23, 2013

(65) Prior Publication Data

US 2014/0111870 A1    Apr. 24, 2014

Related U.S. Application Data

(63) Continuation of application No. PCT/JP2012/004057, filed on Jun. 22, 2012.

(30) Foreign Application Priority Data

Jun. 24, 2011    (JP) .................. 2011-140025

(51) Int. Cl.
*G02B 15/14*    (2006.01)
*G02B 3/02*    (2006.01)
(Continued)

(52) U.S. Cl.
CPC .............. *G02B 15/177* (2013.01); *G02B 15/20* (2013.01); *G02B 15/14* (2013.01); *G02B 13/0045* (2013.01); *H04N 5/23296* (2013.01); *G02B 13/001* (2013.01); *G02B 13/04* (2013.01);
(Continued)

(58) Field of Classification Search
CPC .... G02B 15/177; G02B 15/14; G02B 13/009; G02B 13/04; G02B 13/18; G02B 15/20; G02B 15/161; G02B 15/22; G02B 13/0045; G02B 13/001; G02B 3/02; H04N 5/23296

USPC .................. 359/682–684, 680, 691, 717, 753
See application file for complete search history.

(56) References Cited

U.S. PATENT DOCUMENTS

| | | | |
|---|---|---|---|
| 6,025,961 | A | 2/2000 | Kohno et al. |
| 6,124,987 | A | 9/2000 | Kayanuma et al. |
| 6,351,337 | B1 | 2/2002 | Tanaka |
| 6,654,180 | B2 | 11/2003 | Ori |
| 6,968,128 | B2 | 11/2005 | Itoh |

(Continued)

FOREIGN PATENT DOCUMENTS

| | | |
|---|---|---|
| JP | 11-142734 | 5/1999 |
| JP | 2003-131128 | 5/2003 |

(Continued)

OTHER PUBLICATIONS

International Search Report PCT/JP2012/004057 dated Nov. 6, 2012, with English Translation.

*Primary Examiner* — Evelyn A Lester
(74) *Attorney, Agent, or Firm* — Young & Thompson

(57) ABSTRACT

A zoom lens includes: a first lens group having a negative power; and a second lens group having a refractive power, in this order from an object side. The zoom lens satisfies the following conditional formulae: $1.0 < D2g/D1g < 1.6$, $0.08 < D2t/ft < 0.19$, $1.15 \leq ft/|f1| < 1.8$, and $1.1 < ft/f2 < 1.9$, wherein D1g is the distance from a most object side lens surface to a most image side lens surface within the first group, D2g and D2t are the distance from a most object side lens surface to a most image side lens surface within the second group and the distance between an object side partial second lens group and an image side partial second lens group when focused on infinity at a telephoto end, respectively, ft is the focal length of the entire system at the telephoto end, and f1 and f2 are the focal lengths of the first group and the second group, respectively.

11 Claims, 17 Drawing Sheets

(51) Int. Cl.
   *G02B 13/04* (2006.01)
   *G02B 15/177* (2006.01)
   *G02B 15/20* (2006.01)
   *G02B 13/00* (2006.01)
   *H04N 5/232* (2006.01)
   *G02B 15/16* (2006.01)
   *G02B 13/18* (2006.01)
   *G02B 15/22* (2006.01)

(52) U.S. Cl.
   CPC ............... *G02B15/161* (2013.01); *G02B 13/18* (2013.01); *G02B 3/02* (2013.01); *G02B 15/22* (2013.01); *G02B 13/009* (2013.01)

(56) References Cited

U.S. PATENT DOCUMENTS

| | | |
|---|---|---|
| 7,576,924 B2 | 8/2009 | Katakura |
| 2006/0203355 A1 | 9/2006 | Tomioka |
| 2010/0254023 A1* | 10/2010 | Ito ................................. 359/682 |

FOREIGN PATENT DOCUMENTS

| | | |
|---|---|---|
| JP | 2006-251437 | 9/2006 |
| JP | 2007-025373 | 2/2007 |
| JP | 2007-093971 | 4/2007 |
| JP | 2007-279232 | 10/2007 |

* cited by examiner

FIG.1
EXAMPLE 1
A
WIDE ANGLE END
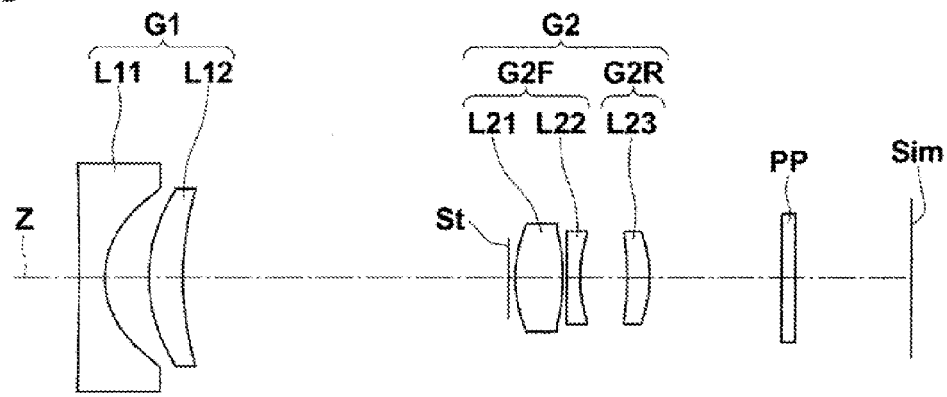
B
TELEPHOTO END
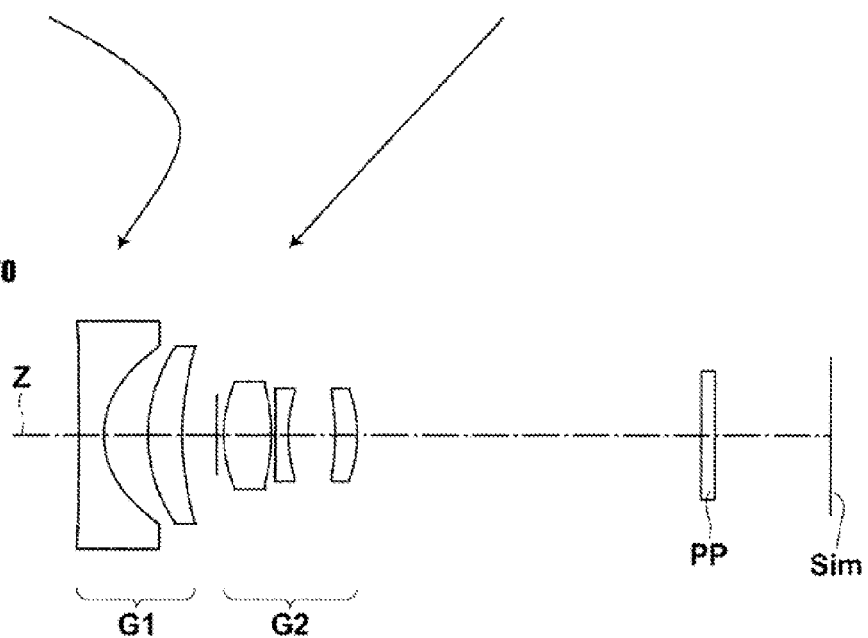

FIG.2
A
WIDE ANGLE END
EXAMPLE 2
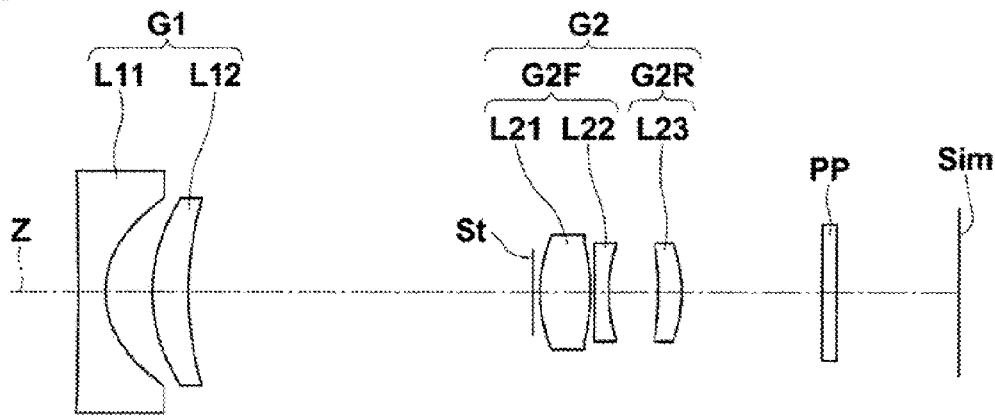
B
TELEPHOTO END
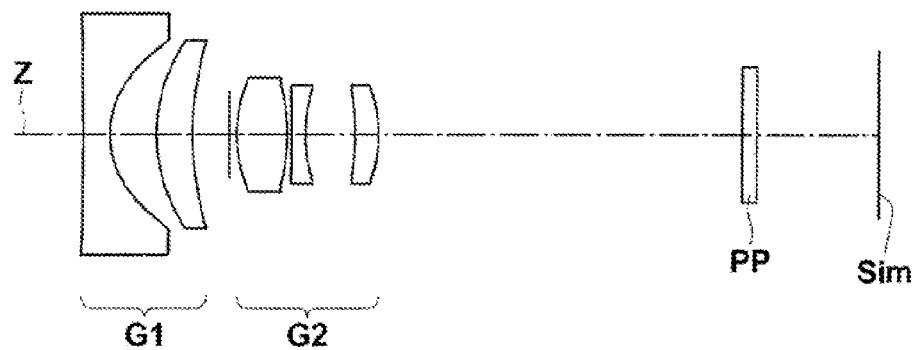

FIG.3
A
WIDE ANGLE
END
EXAMPLE 3
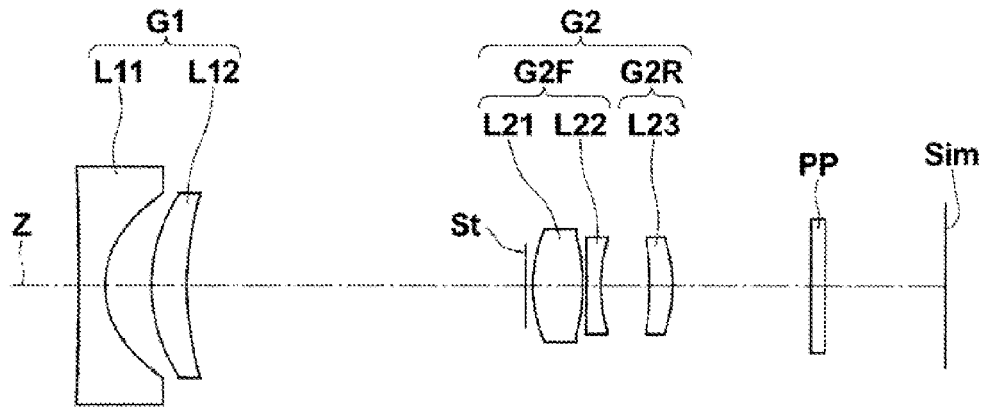
B
TELEPHOTO
END
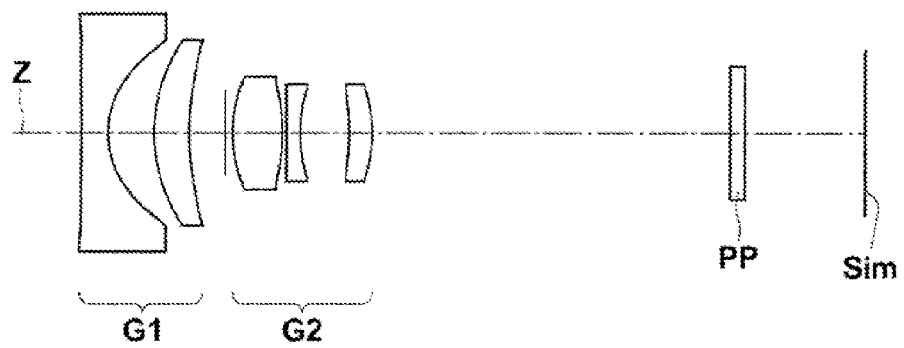

FIG.4
EXAMPLE 4
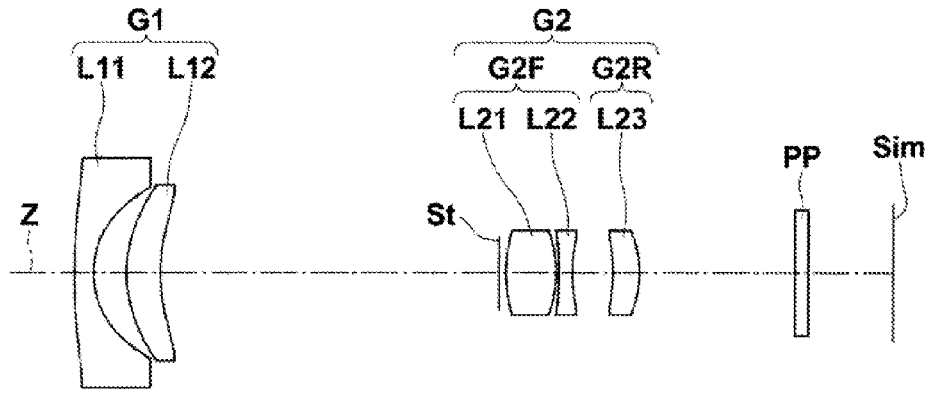
A
WIDE ANGLE END
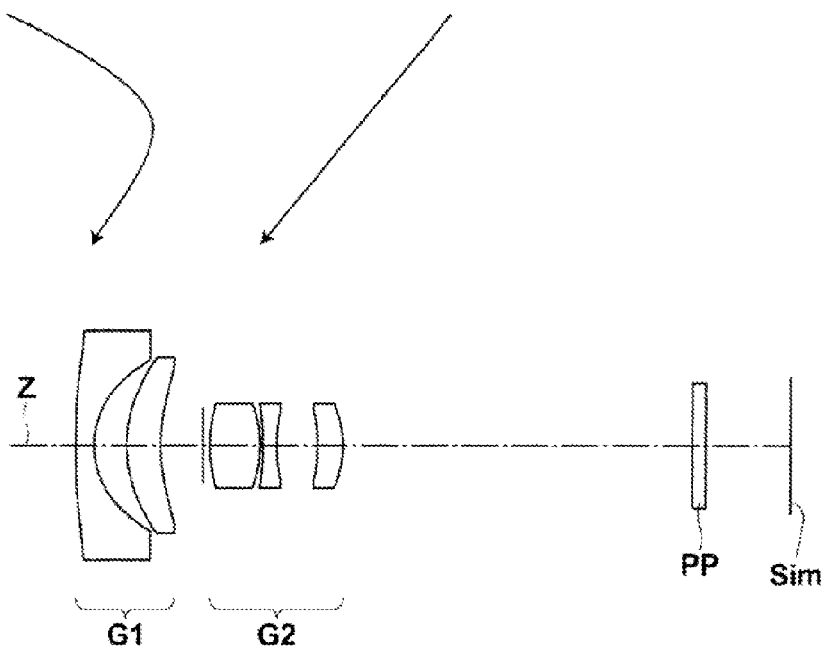
B
TELEPHOTO END

FIG.5
EXAMPLE 5
A
WIDE ANGLE END
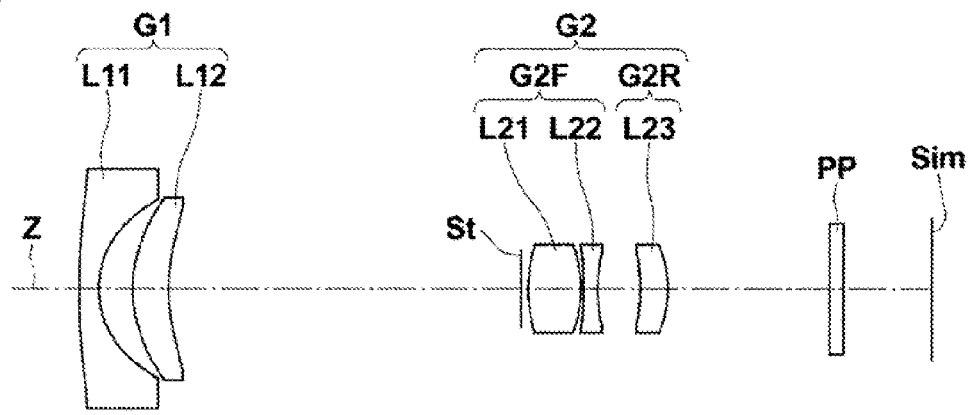
B
TELEPHOTO END
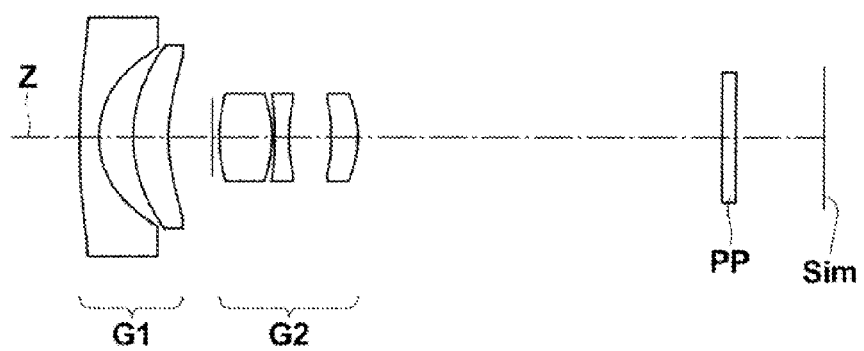

FIG.6
EXAMPLE 6
A WIDE ANGLE END
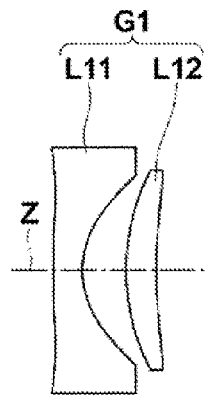
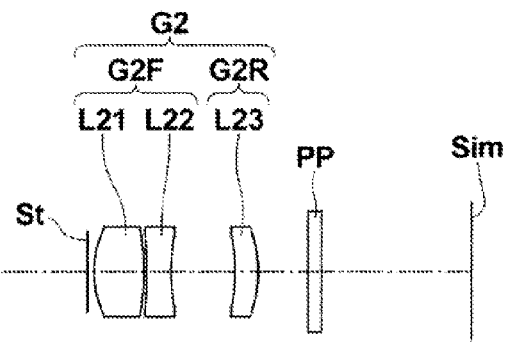
B TELEPHOTO END
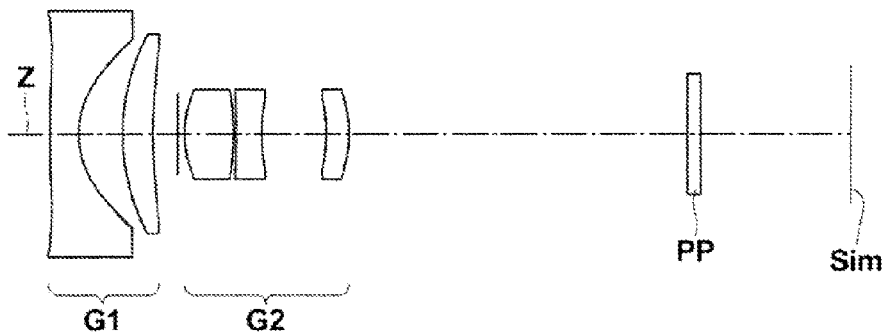

FIG.7
A
WIDE ANGLE END
REFERENCE EXAMPLE
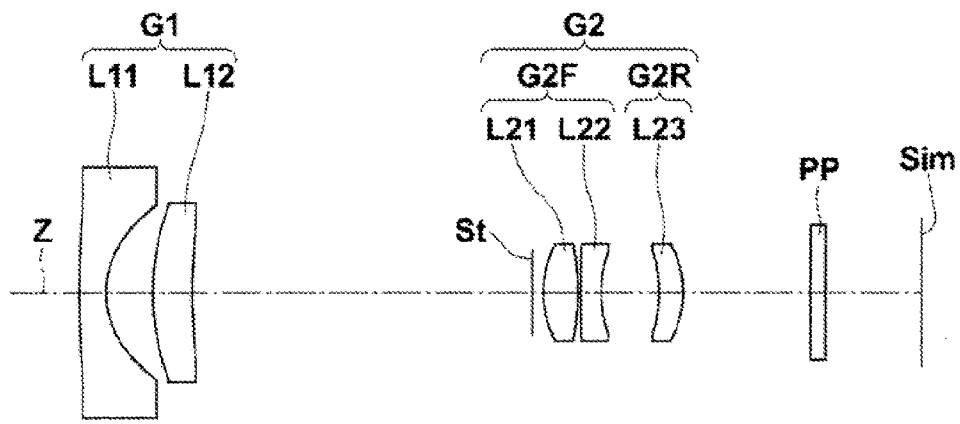
B
TELEPHOTO END
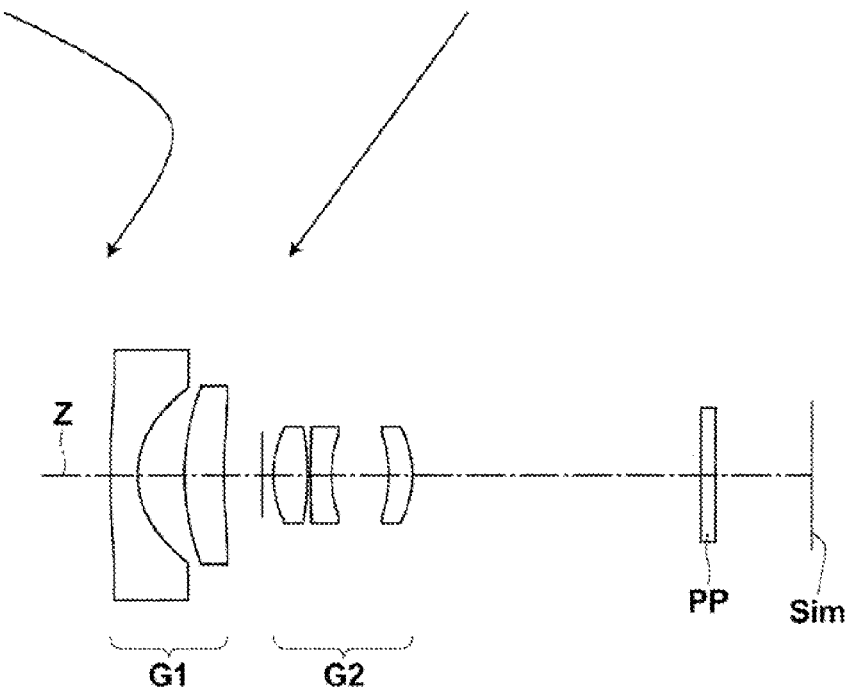

FIG.8
EXAMPLE 8
A
WIDE ANGLE END
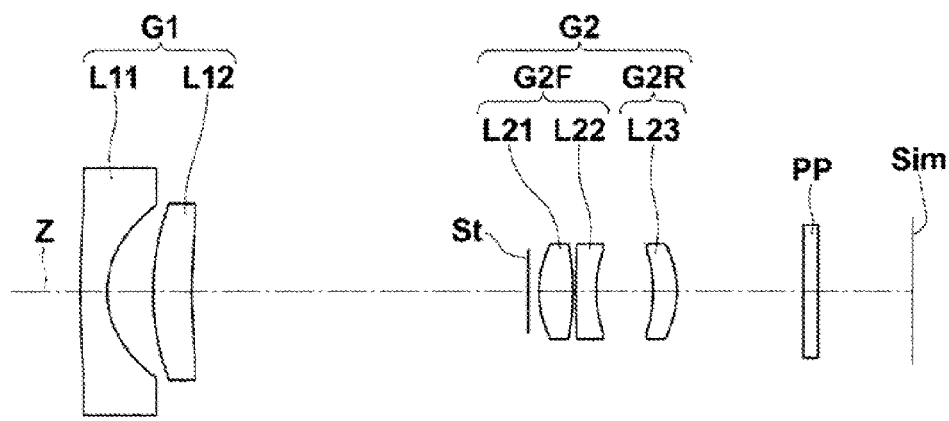
B
TELEPHOTO END
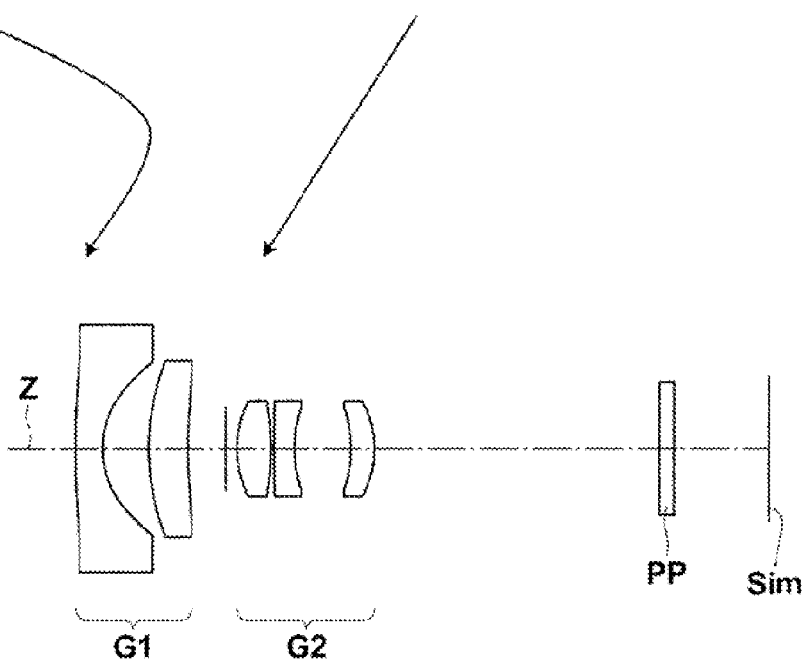

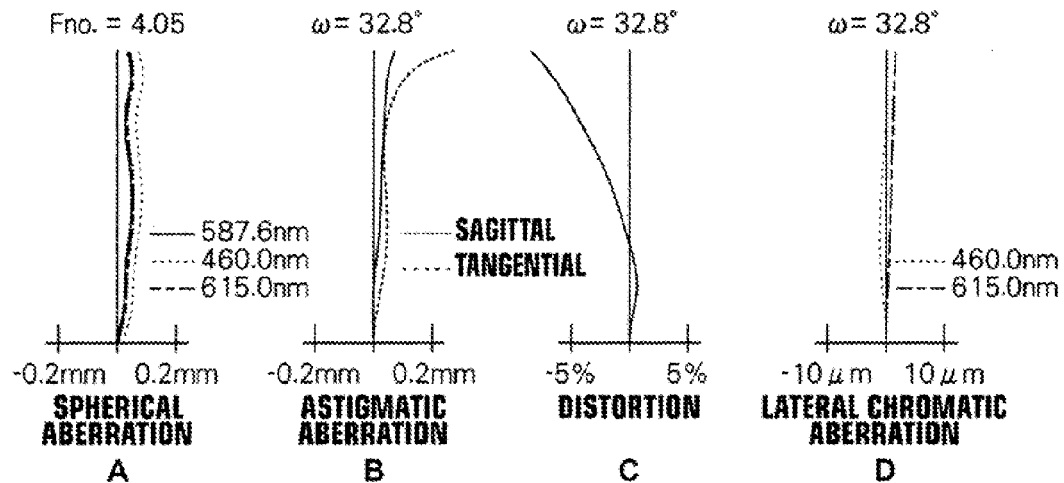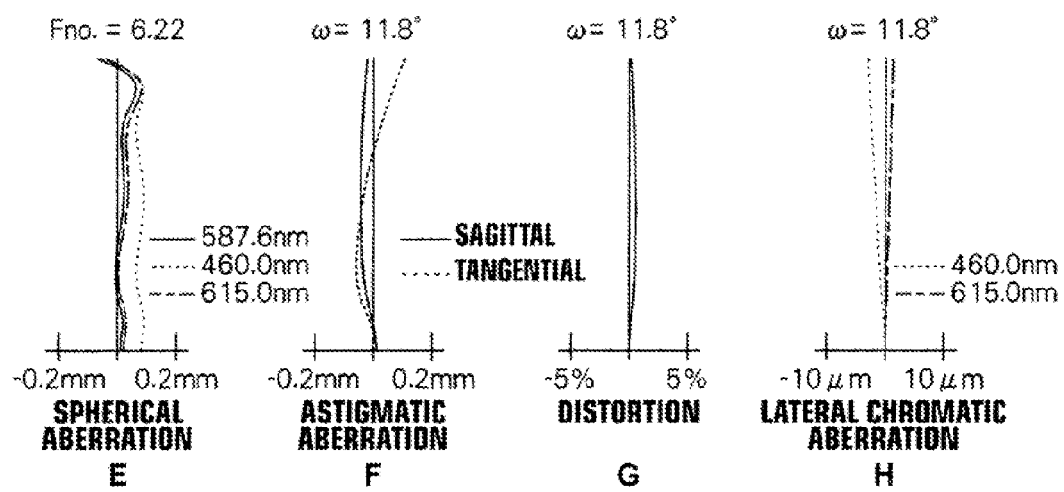
FIG.9

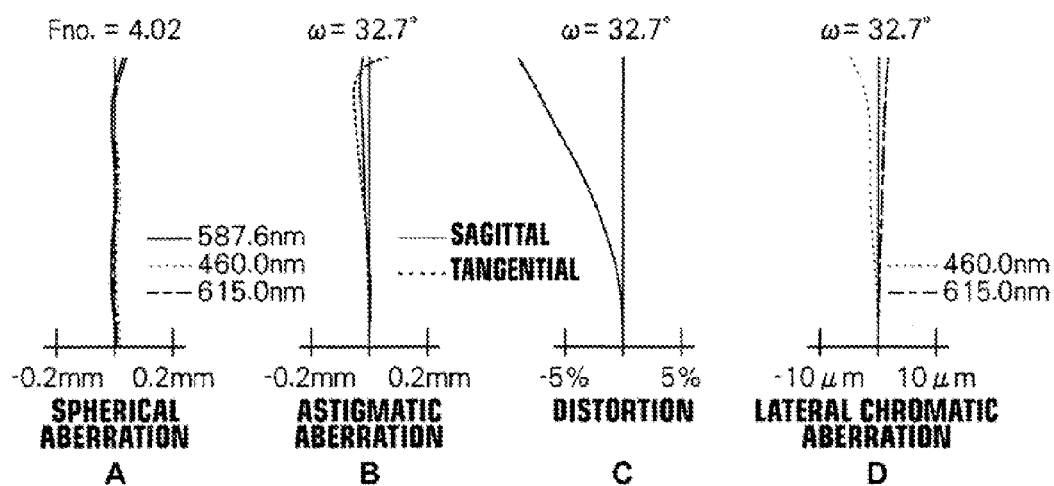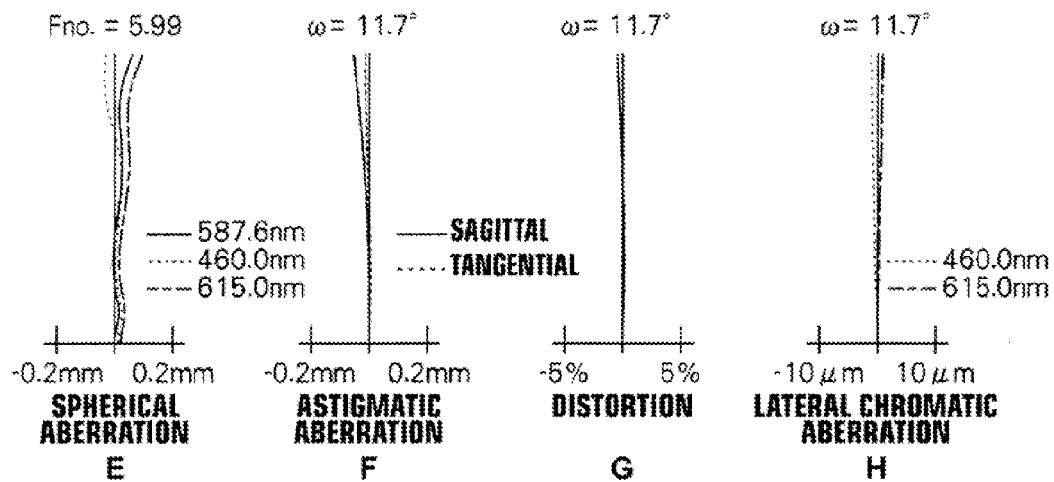
FIG.10

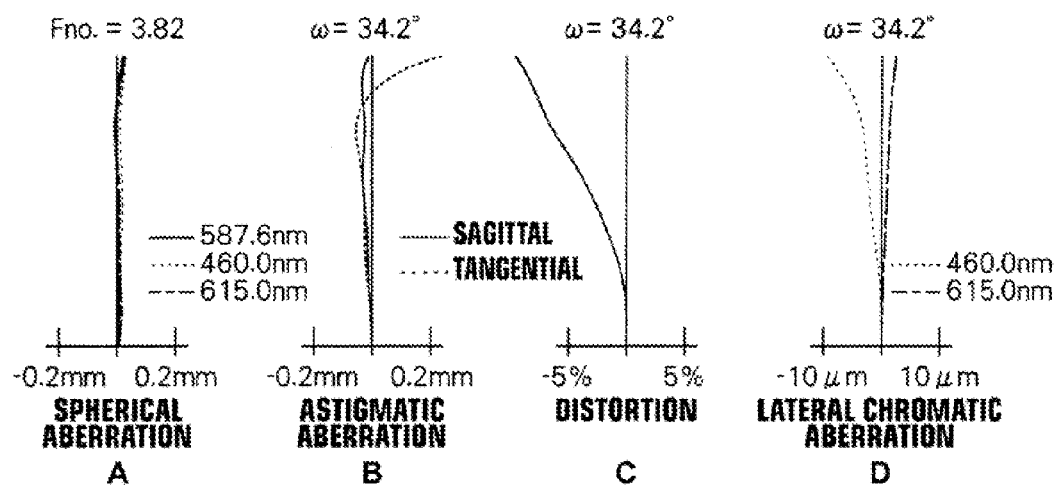
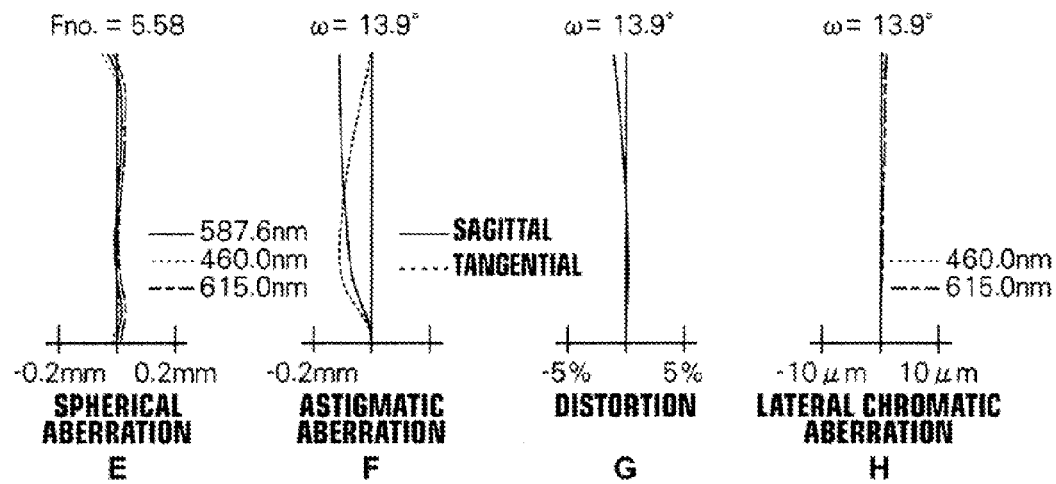
FIG.11

FIG.12
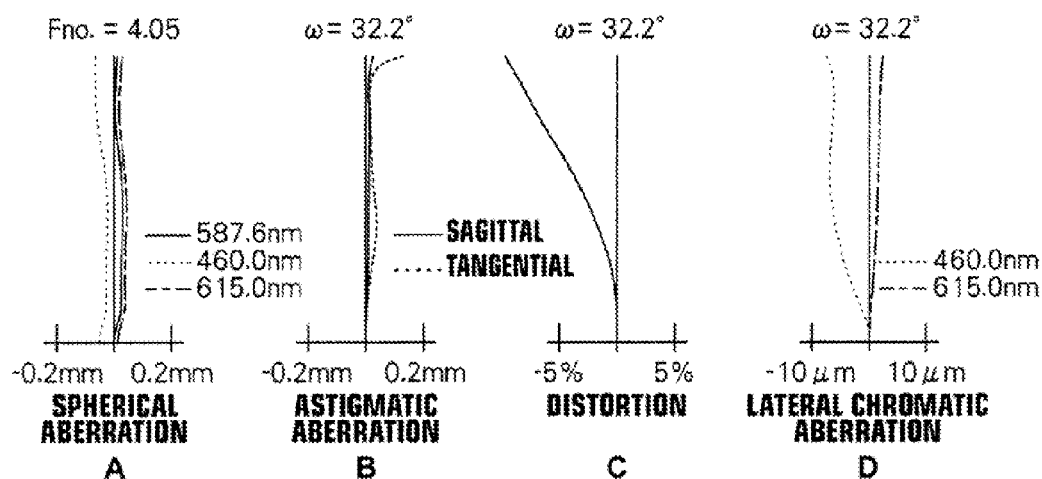
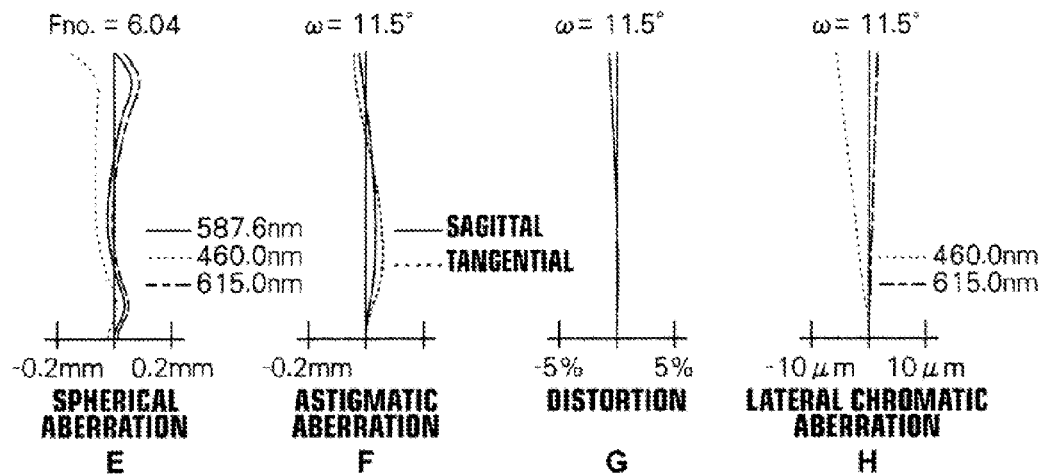

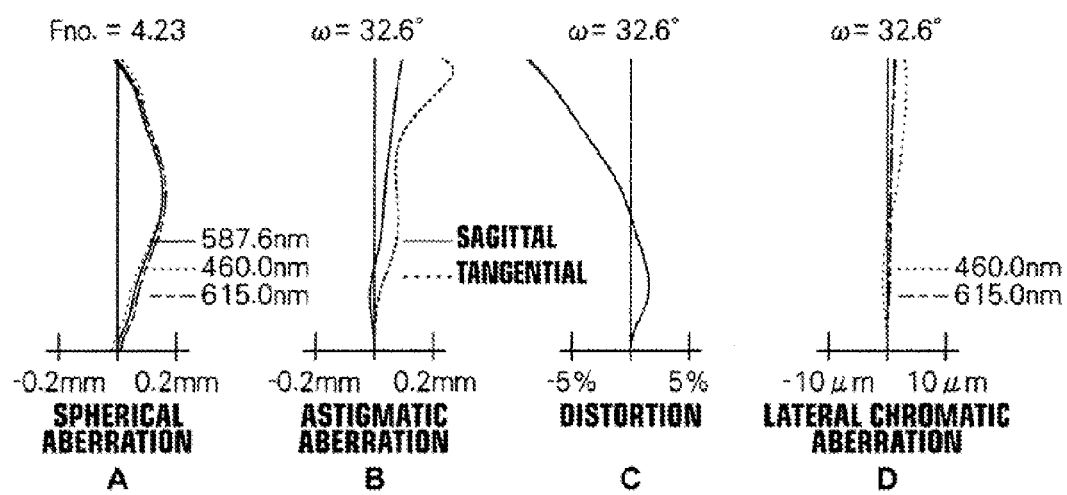
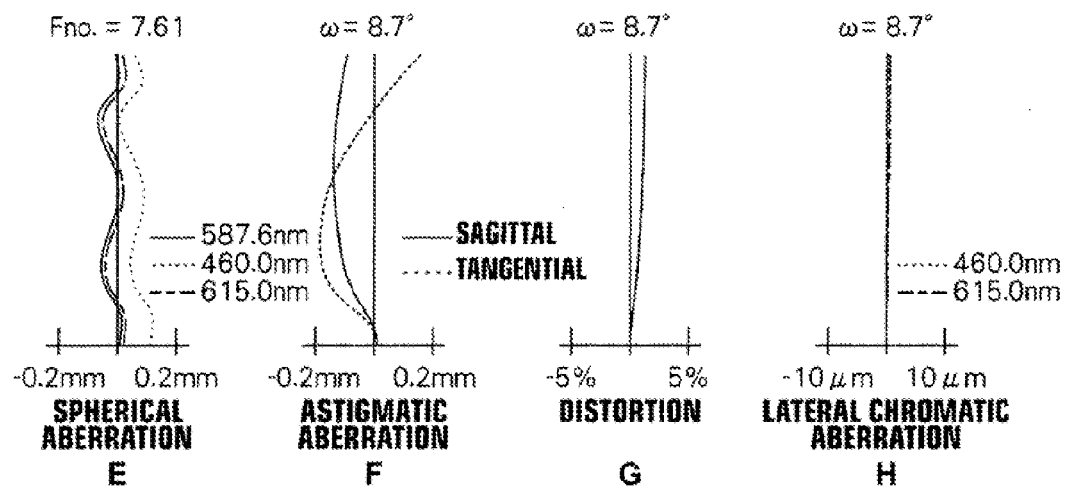
FIG.13 EXAMPLE 5

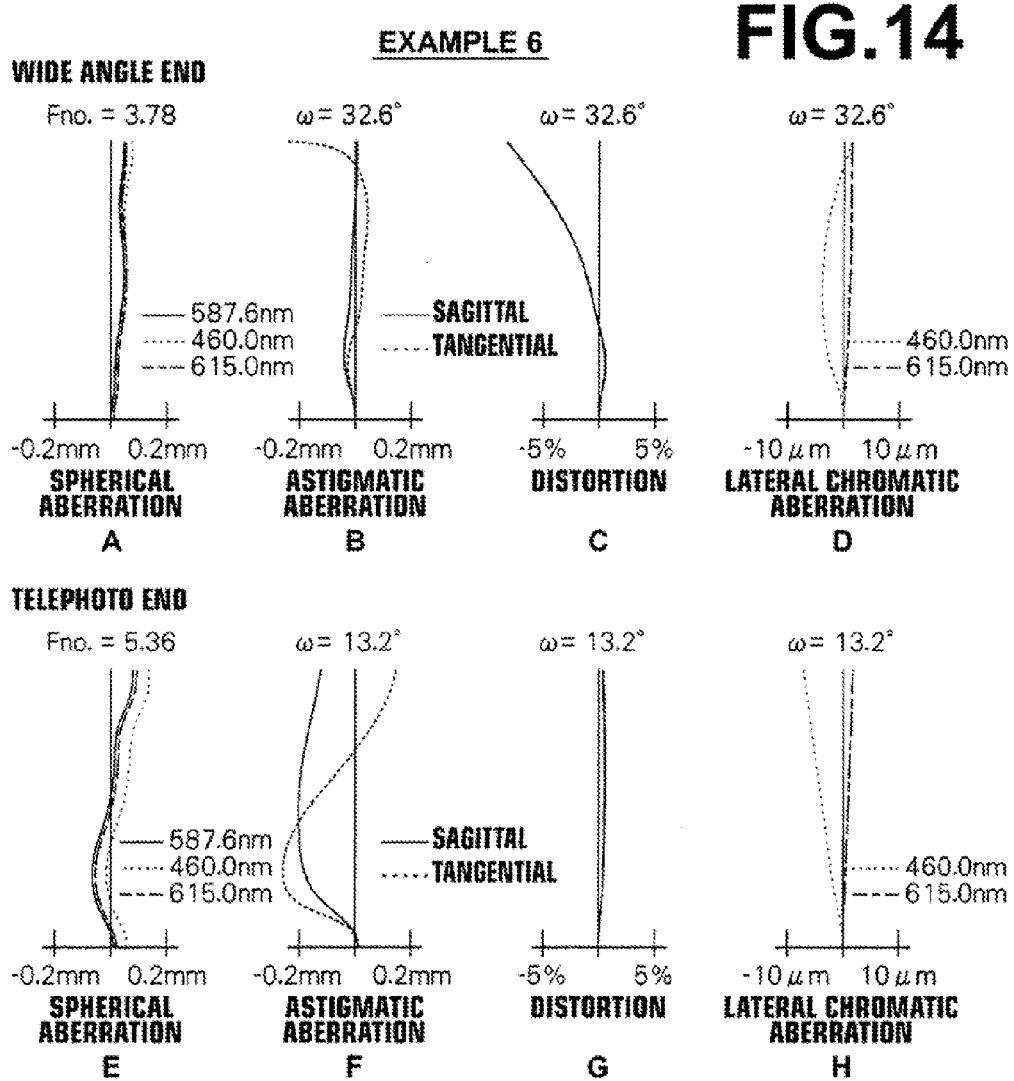

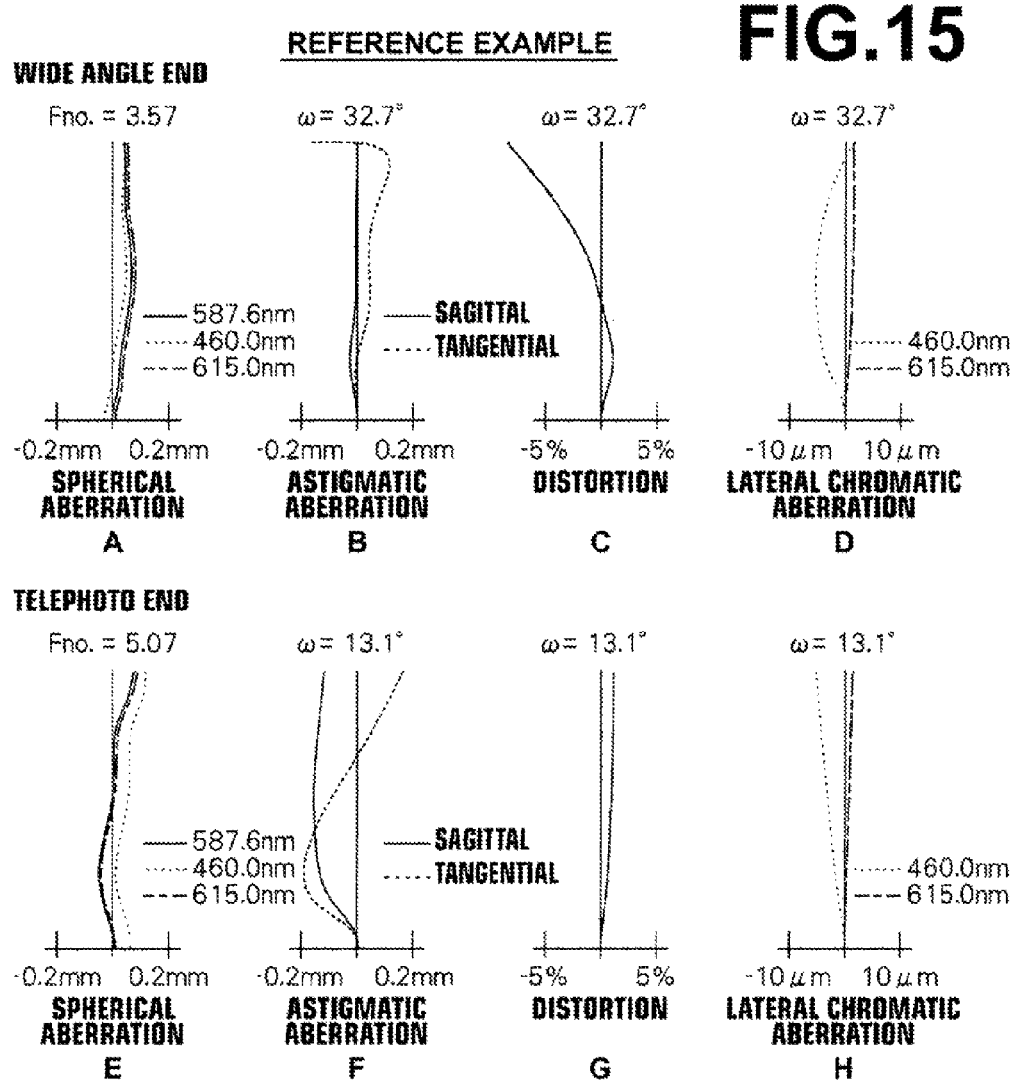

FIG.16
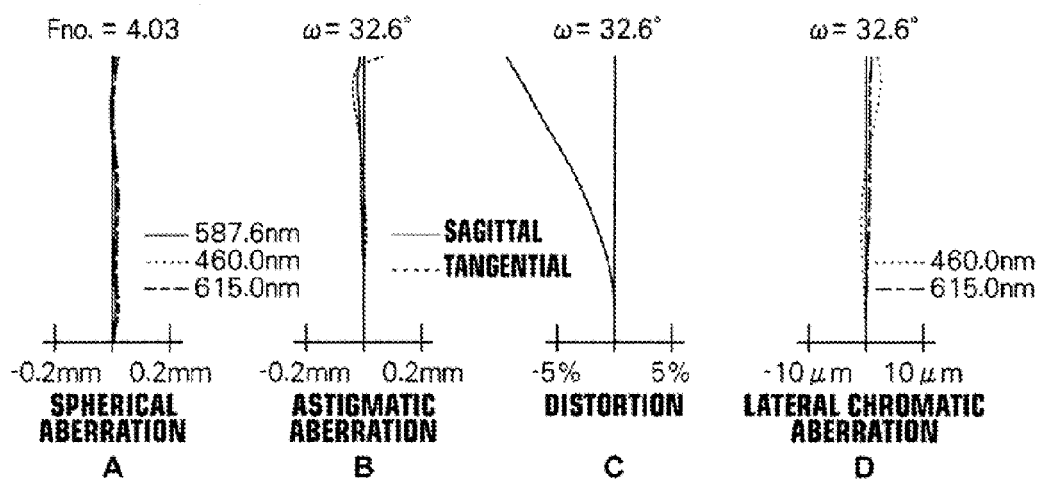
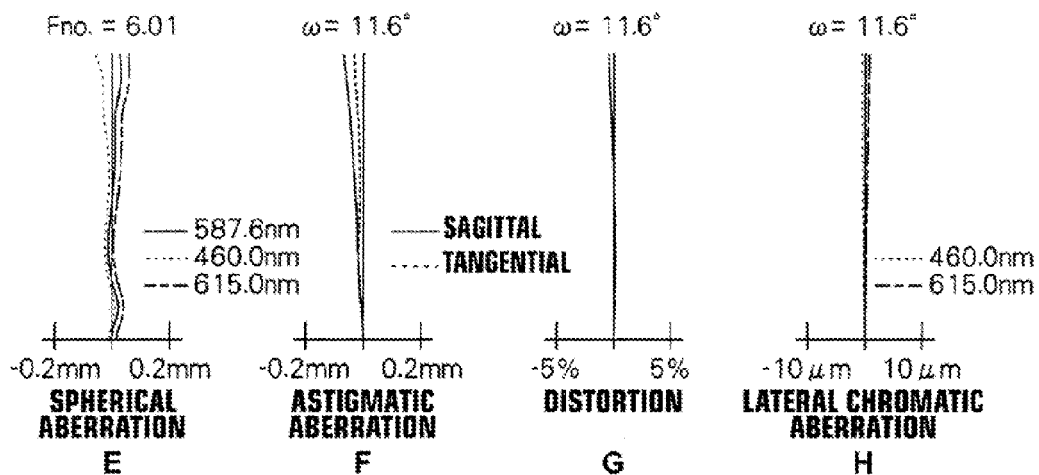

ZOOM LENS AND IMAGING APPARATUS

TECHNICAL FIELD

The present invention is related to a zoom lens and an imaging apparatus. Particularly, the present invention is related to a zoom lens which can be favorably utilized in miniature cameras and portable terminal devices, and to an imaging apparatus equipped with such a zoom lens.

BACKGROUND ART

Conventionally, zoom lenses of the two group or the three group type having leading negative lens groups (a configuration in which negative lens groups are provided toward the object side) are well known as zoom lenses to be provided in compact digital cameras, compact video cameras, and portable terminal devices. The rear focus method, in which the weight of lenses can be decreased compared to the front focus method, is often employed as the focusing method of such zoom lenses.

Several focusing methods have also been proposed, in which only a portion of a plurality of lens groups or only a single lens is moved to perform focusing operations instead of moving the entirety of rearward lens groups, in order to accelerate focusing operations and to reduce the weight of lenses to be moved for focusing operations. The zoom lenses disclosed in Japanese Unexamined Patent Publication No. 2007-279232, U.S. Pat. No. 6,124,987, U.S. Pat. No. 6,351,337, U.S. Pat. No. 6,968,128, U.S. Pat. No. 6,654,180, Japanese Unexamined Patent Publication No. 2007-025373, and U.S. Pat. No. 7,576,924, for example, employ such focusing methods. In these zoom lenses, second lens groups are constituted by an object side partial group and an image side partial group. The zoom lens disclosed in Japanese Unexamined Patent Publication No. 2007-279232 performs focusing operations by sieving the object side partial group, and the zoom lenses disclosed in U.S. Pat. No. 6,124,587, U.S. Pat. No. 6,351,337, U.S. Pat. No. 6,968,128, U.S. Pat. No. 6,654,180, Japanese Unexamined Patent Publication No. 2007-025373, and U.S. Pat. No. 7,576,924 perform focusing operations by moving the image side partial groups.

DISCLOSURE OF THE INVENTION

In the case that a focusing method in which only a second lens group or a portion of the lenses of the second lens group is moved is adopted as described above, it is necessary to optimally set the power of the second lens group as a whole and the power distribution within the second lens group, in order to suppress variations in aberrations caused by focusing operations while configuring the entirety of the lens system to be compact. The power distribution within the second lens group refers to the power balance between the object side partial group and the image side partial group in the second lens group, the configuration of each partial group, and distribution of functions such as correction of aberrations. It is necessary to optimally set the power distribution within the second lens group to match specifications such as focal lengths and variable magnification ratios.

For example, the amount of focusing movement (the amount of movement of lenses in order to perform focusing operations) when focusing on close distances increases as the variable magnification ratio becomes greater or as the focal length at the telephoto end becomes longer. It becomes necessary to secure a large space to accommodate such movement, and the lens system becomes large. In order to achieve miniaturization, it is necessary to increase the power of a focusing lens in order to decrease the amount of space within which the lens moves. However, if the power of the focusing lens becomes excessively great, it will not be possible to correct aberrations in a balanced manner. In addition, the degree to which a minimum imaging distance is set in the vicinity of the telephoto end is also important.

Optimally setting each of the above specifications in a balanced manner is an important objective in the design of zoom lenses. However, in the conventional zoom lenses disclosed in Japanese Unexamined Patent Publication No. 2007-279232, U.S. Pat. No. 6,124,987, U.S. Pat. No. 6,351,337, U.S. Pat. No. 6,968,128, U.S. Pat. No. 6,654,180, Japanese Unexamined Patent Publication No. 2007-025373, and U.S. Pat. No. 7,576,924, there are those in which the optical performance and focusing performance are favorable but variable magnification ratios are small, the amounts of focusing movement are excessively great, or the number of lenses that constitute the second lens group is great, resulting the second lens group becoming extremely large. That is, there is room for improvement in the designs of these zoom lenses.

The present invention has been developed in view of the foregoing circumstances. It is an object of the present invention to provide a zoom lens of the leading negative lens group type that can secure a variable magnification ratio of 3× to 5×, that can perform focusing operations at high speed, that can suppress variations in aberrations during focusing operations, and can be formed to be sufficiently compact.

A zoom lens according to the present invention practically comprises:

a first lens group having a negative refractive power; and a second lens group having a positive refractive power, provided in this order from an object side;

the second lens group practically comprising an object side partial second lens group having a positive refractive power and an image side partial second lens group having a positive refractive power;

the distance between the first lens group and the second lens group changing when changing magnification;

focusing being performed by moving the image side partial second lens group along an optical axis; and the zoom lens satisfying the following conditional formulae:

$$1.0 < D2g/D1g < 1.6 \tag{1}$$

$$0.08 < D2t/ft < 0.19 \tag{2}$$

$$1.15 \leq ft/|f1| < 1.8 \tag{3}$$

$$1.1 < ft/f2 < 1.9 \tag{4}$$

wherein D1g is the distance from the surface of a lens most toward the object side to the surface of a lens most toward the image side within the first lens group, D2g and D2t are the distance from the surface of a lens most toward the object side to the surface of a lens most toward the image side within the second lens group and the distance between the object side partial second lens group and the image side partial second lens group along the optical axis when focused on infinity at a telephoto end, respectively, ft is the focal length of the entire system at the telephoto end, and f1 and f2 are the focal lengths of the first lens and the second lens, respectively.

Note that in the zoom lens according to the present invention, it is desirable for the object side partial second lens group to practically comprise a first second lens group lens having a positive refractive power and a second second lens group lens having a negative refractive power; and for the image side partial second lens group to practically comprise a third second lens group lens having a positive refractive power.

Here, the expression "practically comprises a first lens group . . . and a second lens group" means that the zoom lens may also include lenses that practically have any power, optical elements other than lenses such as aperture stops and cover glass, and mechanical components such as lens flanges, a lens barrel, an imaging element, a blur correcting mechanism, etc. This point also applies to the above expression "the object side partial second lens group . . . practically comprise a first second lens group lens . . . and a second second lens group lens . . . ", the above expression "the image side partial second lens group . . . practically comprise a third second lens group lens" that include the term "practically".

Note that in the zoom lens of the present invention, cemented lenses may be employed as the lenses that constitute each lens group. In the case that cemented lenses are employed, they will be counted as n lenses if they are constituted by n lenses cemented together.

The surface shapes and the signs of refractive powers of the lenses of the zoom lens of the present invention will be those in the paraxial regions for lenses that include aspherical surfaces.

It is desirable for the zoom lens according to the present invention to satisfy the following conditional formula:

$$3.9 < fR/fw < 5.5 \quad (5)$$

wherein fR is the focal length of the image side second partial lens group, and fw is the focal length of the entire system at the wide angle end.

Further, it is desirable for the zoom lens according to the present invention to satisfy the following conditional formula:

$$0.05 < D12t/ft < 0.22 \quad (6)$$

wherein D12t is the distance along the optical axis between the surface of a lens in the first lens group most toward the image side and the surface of a lens in the second lens group most toward the object side at the telephoto end, and ft is the focal length of the entire system at the telephoto end.

It is desirable for the zoom lens according to the present invention to adopt a configuration, wherein:

the image side partial second lens group is constituted by one plastic lens having a positive refractive power; and the one plastic lens satisfies the following conditional formulae:

$$1.48 < Nd2r < 1.56 \quad (7)$$

$$50 < vd2r \quad (8)$$

wherein Nd2r and vd2r are the refractive index of the plastic lens with respect to the d line and the Abbe's number of the plastic lens with respect to the d line, respectively.

In the zoom lens according to the present invention, it is desirable for the first lens group to comprise: a first first lens group lens having a negative refractive power, and a second first lens group lens having a positive refractive power, provided in this order from the object side.

In the zoom lens of the present invention, more preferable ranges for the conditions expressed by conditional formulae (1) and (3) through (8) are as follows:

$$1.1 < D2g/D1g < 1.6 \quad (1')$$

$$1.15 \leq ft/|f1| < 1.7 \quad (3')$$

$$1.2 < ft/f2 < 1.9 \quad (4')$$

$$4.0 < fR/fw < 5.5 \quad (5')$$

$$0.05 < D12t/ft < 0.20 \quad (6')$$

$$1.48 < Nd2r < 1.55 \quad (7')$$

$$52 < vd2r \quad (8')$$

Meanwhile, an imaging apparatus according to the present invention is characterized by being equipped with the zoom lens according to the present invention.

The first zoom lens according to the present invention is of a configuration in which focusing is performed by moving the image side partial second lens group along an optical axis; and satisfies Conditional Formulae (1) and (2). Therefore, the first zoom lens according to the present invention exhibits the advantageous effects that a variable signification ratio of 3× to 5× can be secured, focusing operations can be performed at high speed, variations in aberrations during focusing operations can be suppressed, and sufficient miniaturization is enabled.

Hereinafter, these advantageous effects will be described in further detail. Conditional Formula (1) determines the ratio between the thicknesses of the first lens group and the second lens group. If the value of D2g/D1g is less than or equal to the lower limit defined in Conditional Formula (1), it will be necessary to configure the second lens group to be thin. As a result, the movement space of the image side second partial lens group during focusing operations will become small. Therefore, it will not be possible to shorten a close distance imaging distance at which focusing is possible at the telephoto end in order to avoid interference between the lenses and mechanical components. Alternatively, the first lens group will become excessively thick, which is not preferable. Inversely, if the value of D2g/D1g is greater than or equal to the upper limit defined in Conditional Formula (1), the second lens group will become thick, resulting in the total length and the thickness during retraction to become thick. This is not preferable from the viewpoint of miniaturization and increasing the speed of focusing operations. Alternatively, it will become necessary to form the first lens group to be thin. This will necessitate inordinately decreasing a spatial distance necessary for correcting aberrations. Therefore, it will become difficult to correct distortion and field curvature at the wide angle end, and is not preferable.

Meanwhile, Conditional Formula (2) determines the distance between the object side partial second lens group and the image side partial second lens group when focused on infinity at the telephoto end as a ratio with the focal length of the entire system at the telephoto end. If the value of D2t/ft is less than or equal to the lower limit defined in Conditional Formula (2), the movement space will decrease. This will result in the minimum imaging distance at the telephoto end not being able to be shortened as described previously, and is not preferable. In order to decrease the minimum imaging distance in such a case, it will become necessary to increase the power of the image side partial second lens group, which is not preferable because correction of spherical aberrations will become difficult.

The above shortcomings can be prevented in the case that Conditional Formulae (1) and (2) are satisfied, and the aforementioned advantageous effects can be obtained. The advantageous effects obtained by satisfying Conditional Formula (1) will become more prominent if Conditional Formula (1') is satisfied within the range defined in Conditional Formula (1).

Meanwhile, the second zoom lens according to the present invention is of a configuration in which focusing is performed by moving the image side partial second lens group along an optical axis; and satisfies Conditional Formulae (3) and (4).

Therefore, the second zoom lens according to the present invention exhibits the advantageous effects that a variable magnification ratio of 3× to 5× can be secured, focusing operations can be performed at high speed, variations in aberrations during focusing operations can be suppressed, and sufficient miniaturization is enabled.

Hereinafter, these advantageous effects will be described in further detail. Conditional Formula (3) determines the relationship between the focal length of the entire system at the telephoto end and the focal length of the first lens group. If the value of ft/|f1| is less than or equal to the lower limit defined in Conditional Formula (3), the amount of movement when changing magnification will become great, the total length of the lens will become great, and is not preferable because the lens system will become large. Inversely, if the value of ft/|f1| is greater than or equal to the upper limit defined in Conditional Formula (3), correction of field curvature at the wide angle end will become difficult, which is not preferable.

Conditional Formula (4) determines the relationship between the focal length of the entire system at the telephoto end and the focal length of the second lens group. If the value of ft/f2 is less than or equal to the lower limit defined in Conditional Formula (4), the amount of movement when changing magnification will become great, and is not preferable because the lens system will become large. Inversely, if the value of ft/f2 is greater than or equal to the upper limit defined in Conditional Formula (4), it will become necessary to increase the power of the second lens group, which is not preferable because correction of spherical aberrations will become difficult.

The above shortcomings can be prevented in the case that Conditional Formulae (3) and (4) are satisfied, and the aforementioned advantageous effects can be obtained. The advantageous effects obtained by satisfying Conditional Formulae (3) and (4) will become more prominent if Conditional Formulae (3') and (4') are satisfied within the range defined in Conditional Formulae (3) and (4).

Meanwhile, the third zoom lens according to the present invention is of a configuration in which focusing is performed by moving the image side partial second lens group along an optical axis; and satisfies Conditional Formulae (5) and (6). Therefore, the third zoom lens according to the present invention exhibits the advantageous effects that a variable magnification ratio of 3× to 5× can be secured, focusing operations can be performed at high speed, variations in aberrations during focusing operations can be suppressed, and sufficient miniaturization is enabled.

Hereinafter, these advantageous effects will be described in further detail. Conditional Formula (5) determines the relationship between the focal length of the image side second partial lens group (the lens group that moves to perform focusing operations) and the focal length of the entire system at the wide angle end. If the value of fR/fw is less than or equal to the lower limit defined in Conditional Formula (5), it will become necessary to increase the power of the image side partial second lens group, which is not preferable because correction of spherical aberrations will become difficult. Inversely, if the value of fR/fw is greater than or equal to the upper limit defined in Conditional Formula (5), the amount of movement of the image side partial second lens group during focusing operations will increase, which is not preferable.

Conditional Formula (6) determines the relationship between the distance along the optical axis between the surface of a lens in the first lens group most toward the image side and the surface of a lens in the second lens group most toward the object side at the telephoto end, and the focal length of the entire system at the telephoto end. If the value of D12t/ft is less than or equal to the lower limit defined in Conditional Formula (6), it will become difficult to avoid interference among the lenses that constitute the first lens group and the second lens group and lens holding members, etc., which is not preferable. Inversely, if the value of D12t/ft is greater than or equal to the upper limit defined in Conditional Formula (6), it will become difficult to obtain a desired variable magnification ratio while suppressing the total optical length, which is not preferable.

The above shortcomings can be prevented in the case that Conditional Formulae (5) and (6) are satisfied, and the aforementioned advantageous effects can be obtained. The advantageous effects obtained by satisfying Conditional Formulae (5) and (6) will become more prominent if Conditional Formulae (5') and (6') are satisfied within the range defined in Conditional Formulae (5) and (6).

Note that the first zoom lens according to the present invention can obtain the same advantageous effects that are obtained by the second zoom lens of the present invention that satisfies Conditional Formulae (3) and (4) in the case that the first zoom lens satisfies Conditional Formulae (3) and (4). Accordingly, in such a case, the advantageous effects that focusing can be performed at high speed, variations in aberrations can be suppressed, and sufficient miniaturization becomes possible, will become more prominent.

Further, the first zoom lens according to the present invention can obtain the same advantageous effects that are obtained by the third zoom lens of the present invention that satisfies Conditional Formulae (5) and (6) in the case that the first zoom lens satisfies Conditional Formulae (5) and (6). Accordingly, in such a case as well, the advantageous effects that focusing can be performed at high speed, variations in aberrations can be suppressed, and sufficient miniaturization becomes possible, will become more prominent.

Meanwhile, the second acorn lens according to the present invention can obtain the same advantageous effects that are obtained by the third zoom lens of the present invention that satisfies Conditional Formulae (5) and (6) in the case that the second zoom lens satisfies Conditional Formulae (5) and (6). Accordingly, in such a case as well, the advantageous effects that focusing can be performed at high speed, variations in aberrations can be suppressed, and sufficient miniaturization becomes possible, will become more prominent.

In the case that the zoom lens according to the present satisfies Conditional Formulae (7) and (8), wherein Nd2r and vd2r are the refractive index of the plastic lens with respect to the d line and the Abbe's number of the plastic lens with respect to the d line, respectively, it will become possible to favorably correct various aberrations such as chromatic aberration. Conditional Formulae (7) and (8) are conditions that enable utilization of plastic as an optical material having favorable properties. The advantageous effects obtained by satisfying Conditional Formulae (8) and (8) will become more prominent if Conditional Formulae (7') and (8') are satisfied within the range defined in Conditional Formulae (7) and (8).

Meanwhile, the imaging apparatus according to the present invention is equipped with the zoom lens of the present invention that exhibits the advantageous effects described above. Therefore, the imaging apparatus of the present invention can be miniaturized and achieve cost reduction, while having favorable optical performance.

BRIEF DESCRIPTION OF THE DRAWINGS

FIG. 1 is a cross sectional diagram that illustrates the lens configuration of a zoom lens according to a first embodiment of the present invention.

FIG. 2 is a cross sectional diagram that illustrates the lens configuration of a zoom lens according to a second embodiment of the present invention.

FIG. 3 is a cross sectional diagram that illustrates the lens configuration of a zoom lens according to a third embodiment of the present invention.

FIG. 4 is a cross sectional diagram that illustrates the lens configuration of a zoom lens according to a fourth embodiment of the present invention.

FIG. 5 is a cross sectional diagram that illustrates the lens configuration of a zoom lens according to a fifth embodiment of the present invention.

FIG. 6 is a cross sectional diagram that illustrates the lens configuration of a zoom lens according to a sixth embodiment of the present invention.

FIG. 7 is a cross sectional diagram that illustrates the lens configuration of a zoom lens, which is a reference example with respect to the present invention.

FIG. 8 is a cross sectional diagram that illustrates the lens configuration of a zoom lens according to an eighth embodiment of the present invention.

FIG. 9 A through H are graphs that illustrate various aberrations of the zoom lens of the first embodiment.

FIG. 10 A through H are graphs that illustrate various aberrations of the zoom lens of the second embodiment.

FIG. 11 A through H are graphs that illustrate various aberrations of the zoom lens of the third embodiment.

FIG. 12 A through H are graphs that illustrate various aberrations of the zoom lens of the fourth embodiment.

FIG. 13 A through H are graphs that illustrate various aberrations of the zoom lens of the fifth embodiment.

FIG. 14 A through H are graphs that illustrate various aberrations of the zoom lens of the sixth embodiment.

FIG. 15 A through H are graphs that illustrate various aberrations of the zoom lens of the reference example with respect to the present invention.

FIG. 16 A through H are graphs that illustrate various aberrations of the zoom lens of the eighth embodiment.

BEST MODE FOR CARRYING OUT THE INVENTION

Figure 17:
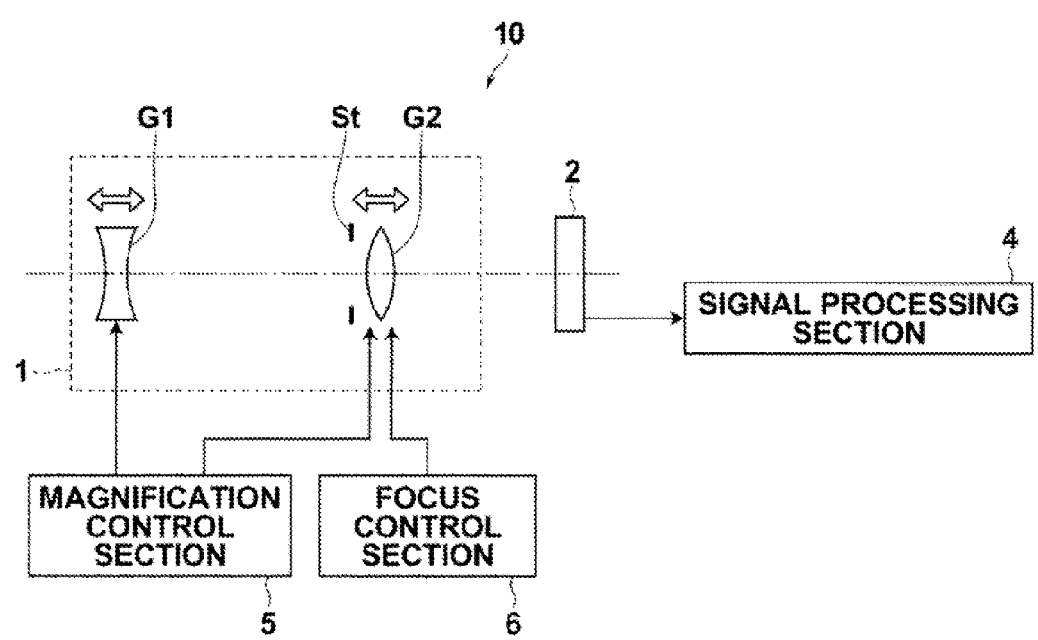
FIG. 17 is a diagram that schematically illustrates an imaging apparatus according to an embodiment of the present invention.

Hereinafter, embodiments of the present invention will be described in detail with reference to the attached drawings. FIG. 1 is a cross sectional diagram that illustrates the configuration of a zoom lens according to an embodiment of the present invention, and corresponds to a zoom lens of Example 1 to be described later. FIG. 2 through FIG. 6 and FIG. 8 are cross sectional diagrams that illustrate configurations of zoom lenses according to other embodiments of the present invention, and corresponds to zoom lenses of Examples 2 through 6 and 8 to be described later. FIG. 7 is a cross sectional diagram that illustrates the configuration of a zoom lens, which is a reference example with respect to the present invention. The basic configurations of the embodiments illustrated in FIG. 1 through FIG. 8 are the same. The manners in which the configurations are illustrated are also the same. Therefore, the zoom lenses according to the embodiments of the present invention will be described mainly with reference to FIG. 1.

In FIG. 1, the left side is the object side and the right side is the image side. A of FIG. 1 illustrates the arrangement of the optical system in a state focused on infinity at the wide angle end (shortest focal length state). B of FIG. 1 illustrates the arrangement of the optical system in a state focused on infinity at the telephoto end (longest focal length state). The same applies to FIGS. 2 through 8 to be described later.

Each of the zoom lenses according to the embodiments of the present invention has a first lens group G1 having a negative refractive power, and a second lens group G2 having a positive refractive power, in this order from the object side. An aperture stop St is included in the second lens group G2. The aperture stop St illustrated in the drawings does not necessarily represent the size or shape thereof, but only the position thereof on an optical axis Z.

Note that FIG. 1 illustrates an example in which a parallel plate optical member PP is provided between the second lens group G2 and an imaging surface Sim. When the zoom lens is applied to an imaging apparatus, it is preferable for various filters, such as a cover glass, an infrared ray cutoff filter, and a low pass filter, to be provided between the optical system and the imaging surface Sim, according to the configuration of a camera on which the lens is to be mounted. The optical member PP is provided assuming the presence of the cover glass, the various types of filters, and the like. In addition, recent imaging apparatuses employ the 3 CCD format, in which CCD's are employed for each color in order to improve image quality. In order to be compatible with imaging apparatuses that employ the 3 CCD format, a color separating optical system such as a color separating prism may be inserted between the lens system and the imaging surface Sim. In this case, a color separating optical system may be provided at the position of the optical member PP.

In this zoom lens, the distance between the first lens group G1 and the second lens group G2 changes when changing magnification from the wide angle end to the telephoto end. That is, the first lens group G1 moves toward the imaging surface Sim along a convex trajectory, the second lens group G2 moves monotonously toward the object side when changing magnification from the wide angle end to the telephoto end, and the aperture stop St moves integrally with the second lens group G2. The movement trajectories of the first lens group G1 and the second lens group G2 when changing magnification from the wide angle end to the telephoto end are illustrated by the arrows indicated between A and B of FIG. 1.

The first lens group G1 is constituted by a first lens L11 having a negative refractive power and a second lens L12 having a positive refractive power, in this order from the object side. Here, the first lens L11 may be a biconcave lens and the second lens L12 may be a positive meniscus lens, as illustrated in the example illustrated in FIG. 1. In the present embodiment, both the first lens L11 and the second lens L12 are plastic lenses. However, the first lens group G1 of the zoom lens of the present invention may be constituted by a number of lenses other than those described above, and also may be constituted by lenses formed by materials other than plastic.

Meanwhile, the second lens group G2 is constituted by an object side partial second lens group G2F having a positive refractive power and provided toward the object side, and an image side partial second lens group G2R having a positive refractive power and provided toward the image side. In the present embodiment, the object side partial second lens group G2F is constituted by a third lens L21 having a positive refractive power (a first second lens group lens) and a fourth lens l22 (a second second lens group lens) having a negative refractive power. The image side partial second lens group G2R is constituted by a fifth lens L23 (a third second lens group lens). In the present embodiment, the fifth lens L23 that constitutes the image side partial second lens group G2R moves along an optical axis Z to perform focusing operations.

The third lens L21 may be a biconvex lens, the fourth lens L22 may be a biconcave lens, and the fifth lens L23 may be a positive meniscus lens as in the example illustrated in FIG. 1. All of the lenses L21, L22, and L23 of the second lens group G2 are plastic lenses. However, the second lens group G2 of the zoom lens of the present invention may be constituted by a number of lenses other than those described above, and also may be constituted by lenses formed by materials other than plastic.

As described above, the first lens group G1 is constituted by the two lenses L11 and L12, and the second lens group G2 is constituted by the three lenses L21, L22, and L23. All of the lenses are plastic lenses. Thereby, cost reduction can be achieved.

Among the configurations illustrated in FIGS. 1 through 8, the first lens L11 is formed by a material other than plastic in the configurations of FIG. 2 and FIG. 8. In all of the other configurations, all five of the lenses are plastic lenses.

The present zoom lens satisfies the following conditional formulae:

$$1.0 < D2g/D1g < 1.6 \quad (1)$$

$$0.08 < D2t/ft < 0.19 \quad (2)$$

wherein D1g is the distance from the surface of a lens most toward the object side (the surface of the first lens L11 toward the object side, which is a surface having surface number 1 in Table 1 to be described later) to the surface of a lens most toward the image side (the surface of the second lens L12 toward the image side, which is a surface having surface number 4 in Table 1 to be described later) within the first lens group G1, D2g and D2t are the distance from the surface of a lens most toward the object side (the surface of the third lens L21 toward the object side, which is a surface having surface number 6 in Table 1 to be described later) to the surface of a lens most toward the image side (the surface of the fifth lens L13 toward the image side, which is a surface having surface number 11 in Table 1 to be described later) within the second lens group G1 and the distance between the object side partial second lens group G2F and the image side partial second lens group G2R along the optical axis when focused on infinity at a telephoto end, respectively, and ft is the focal length of the entire system at the telephoto end.

Note that examples of numerical values which are determined by Conditional Formulae (1) and (2) are shown for each Example in Table 25. In addition, Table 25 also shows examples of numerical values of each condition determined by Conditional Formulae (3) through (8) to be described later.

In addition, the present zoom lens satisfies the following conditional formulae:

$$1.15 \leq ft/|f1| < 1.8 \quad (3)$$

$$1.1 < ft/f2 < 1.9 \quad (4)$$

wherein ft is the focal length of the entire system at the telephoto end, and f1 and f2 are the focal lengths of the first lens group G1 and the second lens group G2, respectively.

In addition, the present zoom lens satisfies the following conditional formula:

$$3.9 < fR/fw < 5.5 \quad (5)$$

wherein fR is the focal length of the image side second partial lens group G2R, and fw is the focal length of the entire system at the wide angle end.

Further, the present zoom lens satisfies the following conditional formula:

$$0.05 < D12t/ft < 0.22 \quad (6)$$

wherein D12t is the distance along the optical axis Z between the surface of a lens in the first lens group most toward the image side (the surface of the second lens L12 toward the image side) and the surface of a lens in the second lens group most toward the object side (the surface of the third lens L21 toward the object side) at the telephoto end, and ft is the focal length of the entire system at the telephoto end.

The present zoom lens satisfies the following conditional formulae:

$$1.48 < Nd2r < 1.56 \quad (7)$$

$$50 < vd2r \quad (8)$$

wherein Nd2r and vd2r are the refractive index of the fifth lens L23, which is a plastic lens, with respect to the d line and the Abbe's number of the fifth lens L23, which is a plastic lens, with respect to the a line, respectively.

Note that more preferable ranges for the conditions expressed by conditional formulae (1) and (3) through (8) are as follows:

$$1.1 < D2g/D1g < 1.6 \quad (1')$$

$$1.15 \leq ft/|f1| < 1.7 \quad (3')$$

$$1.2 < ft/f2 < 1.9 \quad (4')$$

$$4.0 < fR/fw < 5.5 \quad (5')$$

$$0.05 < D12t/ft < 0.20 \quad (6')$$

$$1.48 < Nd2r < 1.55 \quad (7')$$

$$52 < vd2r \quad (8')$$

The present zoom lens satisfies all of these conditional formulae as well.

The present zoom is of a configuration in which focusing is performed by moving the fifth lens L23, which is the image side partial second lens group G2R, along the optical axis Z; and satisfies Conditional Formulae (1) and (2). Therefore, the first zoom lens according to the present invention exhibits the advantageous effects that a variable magnification ratio of 3× to 5× can be secured, focusing operations can be performed at high speed, variations in aberrations during focusing operations can be suppressed, and sufficient miniaturization is enabled.

That is, Conditional Formula (1) determines the ratio between the thicknesses of the first lens group G1 and the second lens group G2. If the value of D2g/D1g is less than or equal to the lower limit defined in Conditional Formula (1), it will be necessary to configure the second lens group G2 to be thin. As a result, the movement space of the image side second partial lens group G2R during focusing operations will become small. Therefore, it will not be possible to shorten a close distance imaging distance at which focusing is possible at the telephoto end in order to avoid interference between the lenses and mechanical components. Alternatively, the first lens group G1 will become excessively thick, which is not preferable. Inversely, if the value of D2g/D1g is greater than or equal to the upper limit defined in Conditional Formula (1), the second lens group G2 will become thick, resulting in the total length and the thickness during retraction to become thick. This is not preferable from the viewpoint of miniaturization and increasing the speed of focusing operations. Alternatively, it will become necessary to form the first lens group G1 to be thin. This will necessitate inordinately decreasing a spatial distance necessary for correcting aberrations. Therefore, it will become difficult to correct distortion and field curvature at the wide angle end, and is not preferable.

Meanwhile, Conditional Formula (2) determines the distance along the optical axis Z between the object side partial second lens group G2F and the image side partial second lens group G2R when focused on infinity at the telephoto end as a ratio with the focal length of the entire system at the telephoto end. If the value of D2t/ft is less than or equal to the lower limit defined in Conditional Formula (2), the movement space will decrease. This will result in the minimum imaging distance at the telephoto end not being able to be shortened as described previously, and is not preferable. In order to decrease the minimum imaging distance in such a case, it will become necessary to increase the power of the image side partial second lens group G2R, which is not preferable because correction of spherical aberrations will become difficult.

The present zoom lens satisfies Conditional Formulae (1) and (2), and therefore the above shortcomings can be prevented, and the aforementioned advantageous effects can be obtained. The above advantageous effects are more prominent, because the present zoom lens satisfies Conditional Formula (1') within the range defined in Conditional Formula (1).

Meanwhile, the present zoom lens satisfies Conditional Formulae (3) and (4). The above advantageous effects can be obtained also based on this point. That is, Conditional Formula (3) determines the relationship between the focal length of the entire system at the telephoto end and the focal length of the first lens group G1. If the value of ft/|f1| is less than or equal to the lower limit defined in Conditional Formula (3), the amount of movement when changing magnification will become great, the total length of the lens will become great, and is not preferable because the lens system will become large. Inversely, if the value of ft/|f1| is greater than or equal to the upper limit defined in Conditional Formula (3), correction of field curvature at the wide angle end will become difficult, which is not preferable.

Conditional Formula (4) determines the relationship between the focal length of the entire system at the telephoto end and the focal length of the second lens group G2. If the value of ft/f2 is less than or equal to the lower limit defined in Conditional Formula (4), the amount of movement when changing magnification will become great, and is not preferable because the lens system will become large. Inversely, if the value of ft/f2 is greater than or equal to the upper limit defined in Conditional Formula (4), it will become necessary to increase the power of the second lens group G2, which is not preferable because correction of spherical aberrations will become difficult.

The present zoom lens satisfies Conditional Formulae (3) and (4), and therefore the above shortcomings can be prevented, and the aforementioned advantageous effects can be obtained. That is, the advantageous effects that focusing operations can be performed at high speed, variations in aberrations during focusing operations can be suppressed, and sufficient miniaturization is enabled, can be obtained. The above advantageous effects are more prominent, because the present zoom lens satisfies Conditional Formulae (3') and (4') within the ranges defined in Conditional Formulae (3) and (4).

Meanwhile, the present zoom lens satisfies Conditional Formulae (5) and (6). The above advantageous effects can be obtained also based on this point. That is, Conditional Formula (5) determines the relationship between the focal length of the image side second partial lens group G2R and the focal length of the entire system at the wide angle end. If the value of fR/fw is less than or equal to the lower limit defined in Conditional Formula (5), it will become necessary to increase the power of the image side partial second lens group G2R, which is not preferable because correction of spherical aberrations will become difficult. Inversely, if the value of fR/fw is greater than or equal to the upper limit defined in Conditional Formula (5), the amount of movement of the image side partial second lens group G2R during focusing operations will increase, which is not preferable.

Conditional Formula (6) determines the relationship between the distance along the optical axis Z between the surface of a lens in the first lens group most toward the image side (the surface of the second lens L12 toward the image side) and the surface of a lens in the second lens group most toward the object side (the surface of the third lens L21 toward the object side) at the telephoto end, and the focal length of the entire system at the telephoto end. If the value of D12f/ft is less than or equal to the lower limit defined in Conditional Formula (6), it will become difficult to avoid interference among the lenses that constitute the first lens group G1 and the second lens group G2 and lens holding members, etc., which is not preferable. Inversely, if the value of D12t/ft is greater than or equal to the upper limit defined in Conditional Formula (6), it will become difficult to obtain a desired variable magnification ratio while suppressing the total optical length, which is not preferable.

The present zoom lens satisfies Conditional Formulae (5) and (6), and therefore the above shortcomings can be prevented, and the aforementioned advantageous effects can be obtained. That is, the advantageous effects that focusing operations can be performed at high speed, variations in aberrations during focusing operations can be suppressed, and sufficient miniaturization is enabled, can be obtained. The above advantageous effects are more prominent, because the present zoom lens satisfies Conditional Formulae (5') and (6') within the ranges defined in Conditional Formulae (5) and (6).

In addition, the present zoom lens satisfies Conditional Formulae (7) and (8), and therefore various aberrations such as chromatic aberration can be favorably corrected. In the case that Conditional Formulae (7) and (8) are satisfied, it becomes possible to form the fifth lens L23 from a plastic having favorable properties as an optical material. The above advantageous effects are more prominent, because the present zoom lens satisfies Conditional Formulae (7') and (8') within the ranges defined in Conditional Formulae (7) and (8).

Note that FIG. 1 illustrates an example in which the optical member PP is provided between the lens system and the imaging surface. Alternatively, various filters such as low pass filters and filters that cut off specific wavelength bands may be provided among each of the lenses. As a further alternative, coatings that have the same functions as the various filters may be administered on the surfaces of the lenses.

Next, examples of the numerical values of the zoom lens of the present invention will be described. The cross sections of the lenses of the zoom lenses of Examples 1 through 6 and 8 are those illustrated in FIGS. 1 through 6 and 8, respectively.

Regarding the zoom lens of Example 1, basic lens data are shown in Table 1, data related to zoom are shown in Table 2, and aspherical surface data are shown in Table 3. Similarly, basic lens data, data related to zoom, and aspherical surface data of the zoom lenses of Examples 2 through 6 are shown in Table 4 through Table 18. Basic lens data, data related to zoom, and aspherical surface data of the zoom lens of the reference example are shown in Tables 19, 20, and 21. Basic lens data, data related to zoom, and aspherical surface data of the zoom lens of Example 8 are shown in Tables 22, 23, and 24. Hereinafter, the meanings of the items in the tables will be described for those related to Example 1. The same applies to the tables related to Examples 2 through 6 and 8, as well as the table related to the reference example.

In the basic lens data of Table 1, the item Si represents ith (i=1, 2, 3, . . . ) lens surface numbers that sequentially increase from the object side to the image side, with the lens surface at the most object side designated as first. The item Ri represents the radius of curvature of ith surfaces, the item Di represents the distance between an ith surface and an i+1st surface along the optical axis Z. Note that the signs of the radii of curvature are positive in cases that the surface shape is convex toward the object side, and negative in cases that the surface shape is convex toward the image side.

In the basic lens data, the item Ndj represents the refractive index of the jth (j=1, 2, 3, . . . ) constituent element that sequentially increases from the object side to the image side, with the lens at the most object side designated as first, with respect to the d line (wavelength: 587.6 nm). The item vdj represents the Abbe's number of the jth constituent element with respect to the d line. Note that the aperture stop St is also included in the basic lens data, and the radius of curvature of the surface corresponding to the aperture stop St is shown as "∞" (aperture stop).

D4 and D11 in the basic lens data of Table 1 represents the distances between surfaces that change when changing magnification. D4 is the distance between the first lens group G1 and the second lens group G2, and D11 is the distance between the second lens group G2 and the optical member PP.

The data of Table 2 related to zoom shows values of the focal length (f), the F value (Fno.), and the full angle of view (2ω) of the entire system and the distances among surfaces at the wide angle end and at the telephoto end.

In the lens data of Table 1, surface numbers of aspherical surfaces are denoted with the mark "★", and radii of curvature of paraxial regions are shown as the radii of curvature of the aspherical surfaces. The aspherical surface data of Table 3 show the surface numbers of the aspherical surfaces, and the aspherical surface coefficients related to each of the aspherical surfaces. In the numerical values of the aspherical surface data of Table 3, "E-n (n: integer)" means "·10$^{-n}$". Note that the aspherical surface coefficients are the values of the coefficients KA and RAm (m=3, 4, 5, . . . , 12) in the aspherical surface formula below:

$$Zd = C \cdot h^2 / \{1 + (1 - KA \cdot C^2 \cdot h^2)^{1/2}\} + \Sigma RAm \cdot h^m$$

wherein: Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the inverse of the paraxial radius of curvature, and KA and Ram are aspherical surface coefficients (m=1, 2, 3, . . . , 12).

The tables below show numerical values which are rounded off at a predetermined number of digits. In addition, degrees are used as the units for angles and mm are used as the units for lengths in the data of the tables below. However, it is possible for optical systems to be proportionately enlarged or proportionately reduced and utilized. Therefore, other appropriate units may be used.

TABLE 1

Example 1: Basic Lens Data

| Si (Surface Number) | Ri (Radius of Curvature) | Di (Distance) | Ndj (Refractive Index) | vdj (Abbe's Number) |
|---|---|---|---|---|
| *1 | −45.7782 | 1.50 | 1.53389 | 56.0 |
| *2 | 5.6000 | 2.60 | | |
| 3 | 9.3453 | 2.00 | 1.63355 | 23.6 |
| *4 | 15.9288 | D4 | | |
| 5 | ∞ (Aperture Stop) | 0.40 | | |
| *6 | 7.6622 | 2.80 | 1.53389 | 56.0 |
| 7 | −11.1702 | 0.23 | | |
| *8 | −93.6000 | 0.80 | 1.63355 | 23.6 |
| *9 | 10.0000 | 2.76 | | |
| *10 | −14.0449 | 1.30 | 1.53389 | 56.0 |
| *11 | −7.5692 | D11 | | |
| 12 | ∞ | 0.80 | 1.51680 | 64.2 |
| 13 | ∞ | 6.81 | | |

*Aspherical Surface

TABLE 2

Example 1: Data related to Zoom

| Item | Wide Angle End | Telephoto End |
|---|---|---|
| f | 6.96 | 19.69 |
| Fno. | 4.05 | 6.22 |
| 2ω | 65.53 | 23.50 |
| D4 | 19.18 | 2.05 |
| D11 | 7.80 | 20.28 |

TABLE 3

Example 1: Aspherical Surface Coefficients

| | Surface Number | | |
|---|---|---|---|
| | 1 | 2 | 4 |
| KA | −7.1226025 | 0.6195752 | 0.0455753 |
| RA3 | 2.8527533E−03 | 1.3047539E−03 | 8.2616248E−05 |
| RA4 | −4.1473757E−04 | 1.9281865E−03 | −6.5096304E−04 |
| RA5 | 1.1199128E−04 | −1.1017867E−03 | 3.9845953E−04 |
| RA6 | 2.3620192E−05 | 4.1238273E−04 | −1.2520730E−04 |
| RA7 | −1.2231466E−05 | −6.2883982E−05 | 4.5479129E−06 |
| RA8 | −1.5116175E−06 | −2.2860711E−06 | 3.9213839E−06 |
| RA9 | 6.9957609E−07 | 7.0291982E−07 | −2.3604960E−07 |
| RA10 | 1.7009286E−08 | 7.4810093E−08 | −5.0184152E−08 |
| RA11 | 1.8368261E−08 | 1.5817690E−08 | −9.1998820E−09 |
| RA12 | 1.2875680E−09 | −4.6616729E−09 | 2.1005738E−09 |

| | Surface Number | | |
|---|---|---|---|
| | 6 | 8 | 9 |
| KA | −6.3422506 | −9.9709349 | −1.3798846 |
| RA3 | −7.0098873E−04 | 3.6110714E−03 | 3.8373369E−03 |
| RA4 | 2.9006712E−03 | −1.2306536E−03 | 7.4428967E−04 |
| RA5 | −1.2675233E−03 | 9.4348643E−04 | 1.8179553E−04 |
| RA6 | 2.8848355E−04 | −4.2578700E−04 | −5.1888543E−04 |
| RA7 | 4.0291067E−05 | −1.3836334E−04 | −5.9873513E−05 |
| RA8 | −8.9289567E−06 | 1.2562966E−05 | 2.7863066E−05 |
| RA9 | −1.3182102E−05 | 3.7573813E−05 | 1.9831185E−05 |
| RA10 | 3.1220073E−06 | −6.6154532E−06 | −1.9975453E−06 |

| | Surface Number | |
|---|---|---|
| | 10 | 11 |
| KA | −0.5982977 | −1.4767948 |
| RA3 | 3.1690869E−03 | 2.8761485E−03 |
| RA4 | −1.1018539E−04 | −1.4342275E−03 |
| RA5 | −2.5170759E−04 | 1.3243839E−04 |
| RA6 | −1.3571412E−05 | 3.9758109E−06 |
| RA7 | −1.2394601E−05 | −2.1589979E−05 |
| RA8 | −3.2572811E−06 | −5.7942241E−06 |
| RA9 | −3.7427885E−06 | 1.5121874E−06 |
| R10 | 4.1063227E−06 | 1.4766951E−06 |

TABLE 4

Example 2: Basic Lens Data

| Si (Surface Number) | Ri (Radius of Curvature) | Di (Distance) | Ndj (Refractive Index) | vdj (Abbe's Number) |
|---|---|---|---|---|
| *1 | 164.1436 | 1.10 | 1.59522 | 67.7 |
| *2 | 5.7433 | 1.92 | | |
| *3 | 6.3822 | 1.80 | 1.58364 | 30.3 |
| *4 | 9.8892 | D4 | | |
| 5 | ∞ (Aperture Stop) | 0.45 | | |
| *6 | 8.7339 | 2.81 | 1.53389 | 56.0 |
| 7 | −8.3127 | 0.15 | | |
| *8 | −34.2584 | 0.88 | 1.63355 | 23.6 |
| *9 | 12.5305 | 2.40 | | |

TABLE 4-continued

Example 2: Basic Lens Data

| Si (Surface Number) | Ri (Radius of Curvature) | Di (Distance) | Ndj (Refractive Index) | vdj (Abbe's Number) |
|---|---|---|---|---|
| *10 | −8.2229 | 1.50 | 1.53389 | 56.0 |
| *11 | −5.8594 | D11 | | |
| 12 | ∞ | 0.80 | 1.51680 | 64.2 |
| 13 | ∞ | 4.88 | | |

*Aspherical Surface

TABLE 5

Example 2: Data Related to Zoom

| Item | Wide Angle End | Telephoto End |
|---|---|---|
| f | 6.86 | 19.41 |
| Fno. | 4.02 | 5.99 |
| 2ω | 65.40 | 23.41 |
| D4 | 20.00 | 2.00 |
| D11 | 9.17 | 20.29 |

TABLE 6

Example 2: Aspherical Surface Coefficients

| | Surface Number | | | |
|---|---|---|---|---|
| | 1 | 2 | 3 | 4 |
| KA | 5.8660019 | −0.3724449 | 0.3478545 | −0.0435431 |
| RA3 | 3.1635879E−03 | 3.5724815E−03 | 5.8525566E−04 | 4.3030058E−04 |
| RA4 | −1.0670075E−03 | −1.4459305E−04 | −8.9165489E−04 | −1.2048041E−03 |
| RA5 | 3.6456762E−04 | −3.3799251E−04 | 9.5699838E−05 | 4.5983582E−04 |
| RA6 | 1.6187859E−05 | 4.1044480E−04 | 1.7096502E−05 | −1.2249196E−04 |
| RA7 | −1.7563385E−05 | −7.6458236E−05 | 1.4781206E−06 | 7.2610229E−06 |
| RA8 | −1.5410315E−06 | −2.3630385E−06 | −2.8865851E−07 | 3.8209087E−06 |
| RA9 | 7.9146497E−07 | 8.1942302E−07 | −1.6033276E−07 | −3.7976766E−07 |
| RA10 | 2.0452533E−08 | 8.5561544E−08 | 1.6386497E−08 | −4.5553069E−08 |
| RA11 | −1.9164864E−08 | 1.6879677E−08 | 0.0000000E+00 | −8.9898475E−09 |
| RA12 | 1.2638636E−09 | −4.8071032E−09 | 0.0000000E+00 | 2.2931693E−09 |

| | Surface Number | | | |
|---|---|---|---|---|
| | 6 | 8 | 9 | 10 | 11 |
| KA | −9.3296488 | −8.2709928 | −1.4774656 | −0.7961828 | −1.1144701 |
| RA3 | −5.9445399E−04 | 3.0855087E−03 | 2.7989718E−03 | 2.3128505E−04 | 3.3863248E−04 |
| RA4 | 2.4500808E−03 | −2.1071038E−03 | −2.8957697E−04 | 7.6437719E−04 | −1.0808647E−03 |
| RA5 | −1.1999721E−03 | 1.3698932E−03 | 6.8179774E−04 | −8.8457087E−04 | −1.4901730E−04 |
| RA6 | 2.7952974E−04 | −4.1088181E−04 | −5.2103582E−04 | −1.1010812E−05 | −1.8721775E−05 |
| RA7 | 2.3221049E−05 | −1.2620158E−04 | −5.4600196E−05 | −8.3917883E−06 | −2.2450794E−05 |
| RA8 | −9.7139045E−06 | 1.6682920E−05 | 2.9579647E−05 | −1.3210787E−05 | −4.0644752E−06 |
| RA9 | −1.1820661E−05 | 3.7941999E−05 | 1.8880734E−05 | −8.2971807E−07 | 2.2796847E−06 |
| RA10 | 3.0198736E−06 | −7.9792388E−06 | −2.0983973E−06 | 5.7194400E−06 | 1.1878504E−06 |

TABLE 7

Example 3: Basic Lens Data

| Si (Surface Number) | Ri (Radius of Curvature) | Di (Distance) | Ndj (Refractive Index) | vdj (Abbe's Number) |
|---|---|---|---|---|
| *1 | −20.5645 | 1.60 | 1.49023 | 57.5 |
| *2 | 6.1263 | 2.35 | | |
| *3 | 6.3445 | 2.00 | 1.63355 | 23.6 |
| *4 | 8.2928 | D4 | | |
| 5 | ∞ (Aperture Stop) | 0.68 | | |
| *6 | 8.9651 | 3.12 | 1.49023 | 57.5 |
| 7 | −8.2770 | 0.15 | | |
| *8 | −27.3679 | 0.80 | 1.63355 | 23.6 |
| *9 | 15.5299 | 1.60 | | |
| *10 | −12.6111 | 1.52 | 1.49023 | 57.5 |
| *11 | −6.2779 | D11 | | |
| 12 | ∞ | 0.80 | 1.51680 | 64.2 |
| 13 | ∞ | 5.11 | | |

*Aspherical Surface

TABLE 8

Example 3: Data Related to Zoom

| Item | Wide Angle End | Telephoto End |
|---|---|---|
| f | 6.52 | 16.30 |
| Fno. | 3.82 | 5.58 |
| 2ω | 68.37 | 27.88 |
| D4 | 17.81 | 2.35 |
| D11 | 9.28 | 18.28 |

TABLE 9

Example 3: Aspherical Surface Coefficients

| | \multicolumn{4}{c}{Surface Number} |
|---|---|---|---|---|
| | 1 | 2 | 3 | 4 |
| KA | 5.9194754 | −0.2976188 | 0.3481238 | −0.0291212 |
| RA3 | 4.3598852E−03 | 4.4783866E−03 | 5.9393373E−04 | 4.8152812E−04 |
| RA4 | −9.7024522E−04 | −9.2030439E−05 | −8.9222643E−04 | −1.2052165E−03 |
| RA5 | 4.0573032E−04 | −3.2777845E−04 | 9.5883236E−05 | 4.7279137E−04 |
| RA6 | 1.5181958E−05 | 4.1065736E−04 | 1.7225551E−05 | −1.2242635E−04 |
| RA7 | −1.8999133E−05 | −7.5566106E−05 | 1.6214094E−06 | 7.1842660E−06 |
| RA8 | −1.5379964E−06 | −2.3570104E−06 | −3.6208648E−07 | 3.7972277E−06 |
| RA9 | 8.2131760E−07 | 8.3450845E−07 | −1.6169578E−07 | −3.9363182E−07 |
| RA10 | 2.0860411E−08 | 8.6020084E−08 | 1.6163871E−08 | −4.6535079E−08 |
| RA11 | −1.9265008E−08 | 1.7123729E−08 | 0.0000000E+00 | −9.2187052E−09 |
| RA12 | 1.2465085E−09 | −4.7741910E−09 | 0.0000000E+00 | 2.2983654E−09 |

| | \multicolumn{5}{c}{Surface Number} |
|---|---|---|---|---|---|
| | 6 | 8 | 9 | 10 | 11 |
| KA | −9.2491334 | −8.1577317 | −1.4631098 | −0.8200789 | −1.1133056 |
| RA3 | −6.0628453E−04 | 1.9864978E−03 | 2.5166880E−03 | 2.4655487E−03 | 1.3528656E−03 |
| RA4 | 2.4535872E−03 | −2.1002473E−03 | −3.1728902E−04 | 7.5690260E−04 | −1.0691642E−03 |
| RA5 | −1.2216667E−03 | 1.3925085E−03 | 6.4731204E−04 | −8.9906905E−04 | −1.3523063E−04 |
| RA6 | 2.7863770E−04 | −4.1050558E−04 | −5.2136997E−04 | −1.0986199E−05 | −1.8694537E−05 |
| RA7 | 2.2892125E−05 | −1.2597630E−04 | −5.4779531E−05 | −8.4314795E−06 | −2.2390080E−05 |
| RA8 | −9.7640686E−06 | 1.6727066E−06 | 2.9571985E−05 | −1.3223610E−05 | −4.0631087E−06 |
| RA9 | −1.1809591E−05 | 3.7956523E−05 | 1.8884622E−06 | −8.4115398E−07 | 2.2825566E−06 |
| RA10 | 3.0386350E−06 | −7.9782392E−06 | −2.0912566E−06 | 5.7123745E−06 | 1.1894478E−06 |

TABLE 10

Example 4: Basic Lens Data

| Si (Surface Number) | Ri (Radius of Curvature) | Di (Distance) | Ndj (Refractive Index) | νdj (Abbe's Number) |
|---|---|---|---|---|
| *1 | 347.0966 | 1.10 | 1.53389 | 56.0 |
| *2 | 5.9018 | 1.92 | | |
| *3 | 7.6288 | 2.00 | 1.63355 | 23.6 |
| *4 | 9.5788 | D4 | | |
| 5 | ∞ (Aperture Stop) | 0.40 | | |
| *6 | 8.3680 | 2.96 | 1.53389 | 56.0 |
| 7 | −6.9519 | 0.15 | | |
| *8 | −20.5065 | 0.80 | 1.58364 | 30.3 |
| *9 | 9.1705 | 2.40 | | |
| *10 | −11.3730 | 1.56 | 1.53389 | 56.0 |
| *11 | −6.5620 | D11 | | |
| 12 | ∞ | 0.80 | 1.51680 | 64.2 |
| 13 | ∞ | 5.02 | | |

*Aspherical Surface

TABLE 11

Example 4: Data Related to Zoom

| Item | Wide Angle End | Telephoto End |
|---|---|---|
| F | 7.04 | 19.91 |
| Fno. | 4.05 | 6.04 |
| 2ω | 64.40 | 22.90 |
| D4 | 20.00 | 2.49 |
| D11 | 9.15 | 20.62 |

TABLE 12

Example 4: Aspherical Surface Coefficients

| | \multicolumn{4}{c}{Surface Number} |
|---|---|---|---|---|
| | 1 | 2 | 3 | 4 |
| KA | 5.8691700 | −0.304369 | 0.3478553 | −0.0621271 |
| RA3 | 3.7135611E−03 | 4.7249353E−03 | 5.8526255E−04 | −1.6185682E−04 |
| RA4 | −1.0621369E−03 | −1.0078522E−04 | −8.9165481E−04 | −1.2519242E−03 |
| RA5 | 3.4134175E−04 | −3.2030020E−04 | 9.5699847E−05 | 4.2314450E−04 |
| RA6 | 1.5870585E−05 | 4.1044625E−04 | 1.7096504E−05 | −1.2238884E−04 |
| RA7 | −1.7781374E−05 | −7.6305536E−05 | 1.4781293E−06 | 7.4257880E−06 |
| RA8 | −1.5376107E−06 | −2.3596452E−06 | −2.8866577E−07 | 3.8182151E−06 |
| RA9 | 8.0255337E−07 | 8.2321010E−07 | −1.6033147E−07 | −3.8849589E−07 |
| RA10 | 2.0570963E−08 | 8.5589266E−08 | 1.6386349E−08 | −4.5688142E−08 |

TABLE 12-continued

Example 4: Aspherical Surface Coefficients

| RA11 | −1.9232088E−08 | 1.6891169E−08 | 0.0000000E+00 | −9.1479932E−09 |
| RA12 | 1.2581557E−09 | −4.8071358E−09 | 0.0000000E+00 | 2.2915937E−09 |

| | Surface Number | | | |
| --- | --- | --- | --- | --- |
| | 6 | 8 | 9 | 10 | 11 |

| | 6 | 8 | 9 | 10 | 11 |
| --- | --- | --- | --- | --- | --- |
| KA | −9.3381739 | −8.2682422 | −1.4601333 | −0.7872265 | −1.1025890 |
| RA3 | −2.0613067E−04 | 8.0878589E−04 | 8.6893964E−04 | −6.3666885E−04 | −1.7778485E−04 |
| RA4 | 2.4379430E−03 | −2.2039846E−03 | −2.4497686E−04 | 7.3559761E−04 | −1.0881632E−03 |
| RA5 | −1.2280821E−03 | 1.3341155E−03 | 6.7390120E−04 | −8.7809062E−04 | −1.5091073E−04 |
| RA6 | 2.7901083E−04 | −4.1122550E−04 | −5.2105198E−04 | −1.0913409E−05 | −1.8697739E−05 |
| RA7 | 2.2776409E−05 | −1.2647552E−04 | −5.4558962E−05 | −8.3360238E−06 | −2.2416888E−05 |
| RA8 | −9.7167425E−06 | 1.6681180E−05 | 2.9580060E−05 | −1.3210531E−05 | −4.0642246E−06 |
| RA9 | −1.1822208E−05 | 3.7941068E−05 | 1.8880996E−05 | −8.2960637E−07 | 2.2798242E−06 |
| RA10 | 3.0198645E−06 | −7.9792511E−06 | −2.0983954E−06 | 5.7194414E−06 | 1.1878509E−06 |

TABLE 13

Example 5: Basic Lens Data

| Si (Surface Number) | Ri (Radius of Curvature) | Di (Distance) | Ndj (Refractive Index) | νdj (Abbe's Number) |
| --- | --- | --- | --- | --- |
| *1 | 667.9493 | 1.70 | 1.53389 | 56.0 |
| *2 | 5.9189 | 2.63 | | |
| 3 | 13.0877 | 1.80 | 1.63355 | 23.6 |
| *4 | 25.0810 | D4 | | |
| 5 | ∞ (Aperture Stop) | 0.40 | | |
| *6 | 6.2673 | 2.95 | 1.53389 | 56.0 |
| 7 | −15.2975 | 0.15 | | |
| *8 | −39.2059 | 1.50 | 1.63355 | 23.6 |
| *9 | 13.2578 | 3.87 | | |
| *10 | −9.4558 | 1.34 | 1.53389 | 56.0 |
| *11 | −7.9513 | D11 | | |
| 12 | ∞ | 0.80 | 1.51680 | 64.2 |
| 13 | ∞ | 9.04 | | |

*Aspherical Surface

TABLE 14

Example 5: Data Related to Zoom

| Item | Wide Angle End | Telephoto End |
| --- | --- | --- |
| f | 7.03 | 26.51 |
| Fno. | 4.23 | 7.61 |
| 2ω | 65.18 | 17.38 |
| D4 | 26.06 | 1.51 |
| D11 | 2.99 | 20.34 |

TABLE 15

Example 5: Aspherical Surface Coefficients

| | Surface Number | | |
| --- | --- | --- | --- |
| | 1 | 2 | 4 |
| KA | −1.6458977 | 0.9319312 | −0.2414049 |
| RA3 | 2.8142145E−03 | 4.4127578E−04 | 4.5523400E−04 |
| RA4 | −7.2552861E−04 | 2.0982359E−03 | −1.3527207E−03 |
| RA5 | 1.7358227E−04 | −1.1062131E−03 | 5.9785060E−04 |
| RA6 | 2.7645409E−05 | 4.0232515E−04 | −1.3070151E−04 |
| RA7 | −1.6170186E−05 | −7.2077902E−05 | −1.5575544E−06 |
| RA8 | −1.5964432E−06 | −2.3499994E−06 | 3.9794835E−06 |
| RA9 | 7.3680175E−07 | 8.5730493E−07 | −2.1469406E−08 |

TABLE 15-continued

Example 5: Aspherical Surface Coefficients

| RA10 | 2.4135653E−08 | 7.0838348E−08 | −4.3931540E−08 |
| RA11 | −1.7337470E−08 | 1.9148783E−08 | −1.2595477E−08 |
| RA12 | 1.0664384E−09 | −4.6716157E−09 | 1.8653649E−09 |

| | Surface Number | | |
| --- | --- | --- | --- |
| | 6 | 8 | 9 |
| KA | −5.0081934 | 0.8196438 | −0.7906543 |
| RA3 | −3.1925737E−04 | −3.8724044E−04 | −7.5996411E−04 |
| RA4 | 3.9192479E−03 | 1.3457150E−04 | 2.1507398E−03 |
| RA5 | −1.1881014E−03 | 1.0055061E−03 | 5.0465063E−04 |
| RA6 | 2.7832126E−04 | −4.2358042E−04 | −4.9267245E−04 |
| RA7 | 3.2414928E−05 | −1.3184506E−04 | −4.9629881E−05 |
| RA8 | −8.8720642E−06 | 1.2644299E−05 | 2.7168429E−05 |
| RA9 | −1.1316509E−05 | 3.8609265E−05 | 1.8777243E−05 |
| RA10 | 2.7056914E−06 | −7.8246098E−06 | −2.3383010E−06 |

| | Surface Number | |
| --- | --- | --- |
| | 10 | 11 |
| KA | −1.4239776 | −1.9843878 |
| RA3 | 8.7753915E−04 | 1.8519228E−03 |
| RA4 | −9.2007017E−04 | −1.6817600E−03 |
| RA5 | 1.2758839E−04 | 2.3937996E−04 |
| RA6 | −1.7949389E−05 | −8.3240926E−06 |
| RA7 | −2.3400204E−05 | −2.0415758E−05 |
| RA8 | −1.0941685E−05 | −4.9029563E−06 |
| RA9 | −2.0145669E−06 | 1.6140442E−06 |
| RA10 | 4.8954667E−06 | 1.4731184E−06 |

TABLE 16

Example 6: Basic Lens Data

| Si (Surface Number) | Ri (Radius of Curvature) | Di (Distance) | Ndj (Refractive Index) | νdj (Abbe's Number) |
| --- | --- | --- | --- | --- |
| *1 | 243.8096 | 1.50 | 1.53389 | 56.0 |
| *2 | 5.6005 | 2.60 | | |
| 3 | 13.8868 | 2.20 | 1.63355 | 23.6 |
| *4 | 27.4239 | D4 | | |
| 5 | ∞ (Aperture Stop) | 0.63 | | |
| *6 | 6.019 | 1.92 | 1.53389 | 56.0 |
| 7 | −14.4817 | 0.15 | | |
| *8 | 49.1312 | 1.16 | 1.63355 | 23.6 |
| *9 | 7.3371 | 3.20 | | |

TABLE 16-continued

Example 6: Basic Lens Data

| Si (Surface Number) | Ri (Radius of Curvature) | Di (Distance) | Ndj (Refractive Index) | vdj (Abbe's Number) |
|---|---|---|---|---|
| *10 | −7.6769 | 1.32 | 1.53389 | 56.0 |
| *11 | −5.6819 | D11 | | |
| 12 | ∞ | 0.80 | 1.51680 | 64.2 |
| 13 | ∞ | 5.33 | | |

*Aspherical Surface

TABLE 17

Example 6: Data Related to Zoom

| Item | Wide Angle End | Telephoto End |
|---|---|---|
| f | 6.98 | 17.46 |
| Fno. | 3.78 | 5.36 |
| 2ω | 65.29 | 26.36 |
| D4 | 18.93 | 2.14 |
| D11 | 7.15 | 16.11 |

TABLE 18

Example 6: Aspherical Surface Coefficients

| | Surface Number | | |
|---|---|---|---|
| | 1 | 2 | 4 |
| KA | −8.2887989 | 0.9891069 | 0.1787366 |
| RA3 | 1.6287940E−03 | −5.8999567E−04 | 5.1911616E−04 |
| RA4 | −4.7452960E−05 | 2.6010706E−03 | −1.1537690E−03 |
| RA5 | 1.1755249E−04 | −1.1308833E−03 | 4.6962356E−04 |
| RA6 | 1.9422153E−05 | 4.0680354E−04 | −1.2827259E−04 |
| RA7 | −1.5516605E−05 | −6.8565948E−05 | 2.5428959E−06 |
| RA8 | −1.4754109E−06 | −2.3878100E−06 | 3.9792304E−06 |
| RA9 | 7.9623258E−07 | 6.3942330E−07 | −1.5380520E−07 |
| RA10 | 1.6250531E−08 | 7.1888402E−08 | −4.7246403E−08 |
| RA11 | −1.9647187E−08 | 1.8732580E−08 | −1.0819779E−08 |
| RA12 | 1.3596803E−09 | −4.4628017E−09 | 1.8995465E−09 |

| | Surface Number | | |
|---|---|---|---|
| | 6 | 8 | 9 |
| KA | −4.7572781 | 8.7647374 | −0.9824323 |
| RA3 | −8.5849468E−04 | 1.7675630E−03 | 1.6312593E−03 |
| RA4 | 4.2567912E−03 | −1.2252367E−03 | 1.2272709E−03 |
| RA5 | −1.2529886E−03 | 9.3016346E−04 | 3.6569146E−04 |
| RA6 | 2.8294683E−04 | −4.1727373E−04 | −5.0219724E−04 |
| RA7 | 3.5036201E−05 | −1.2996952E−04 | −4.6808797E−05 |
| RA8 | −8.8645669E−06 | 1.4570534E−05 | 2.6032284E−05 |
| RA9 | −1.2323461E−05 | 3.7439221E−05 | 1.9773236E−05 |
| RA10 | 2.9063265E−06 | −7.6387882E−06 | −2.5220050E−06 |

| | Surface Number | |
|---|---|---|
| | 10 | 11 |
| KA | −0.8351873 | −1.9979701 |
| RA3 | 7.3299276E−04 | 3.7594895E−04 |
| RA4 | −7.6002029E−05 | −1.4980151E−03 |
| RA5 | −4.7375648E−04 | −1.4525148E−04 |
| RA6 | −1.9964059E−05 | −1.9799251E−05 |
| RA7 | −2.6504410E−05 | −2.6742588E−05 |
| RA8 | −1.3389795E−05 | −3.0518227E−06 |
| RA9 | −1.0839105E−06 | 1.8157633E−06 |
| RA10 | 5.1067078E−06 | 1.3713245E−06 |

TABLE 19

Reference Example: Basic Lens Data

| Si (Surface Number) | Ri (Radius of Curvature) | Di (Distance) | Ndj (Refractive Index) | vdj (Abbe's Number) |
|---|---|---|---|---|
| *1 | 96.4404 | 1.50 | 1.53389 | 56.0 |
| *2 | 6.0364 | 2.60 | | |
| 3 | 16.8467 | 2.20 | 1.63355 | 23.6 |
| *4 | 29.8967 | D4 | | |
| 5 | ∞ (Aperture Stop) | 0.40 | | |
| *6 | 5.6965 | 2.20 | 1.53389 | 56.0 |
| 7 | −13.5042 | 0.15 | | |
| *8 | 54.3664 | 1.24 | 1.63355 | 23.6 |
| *9 | 7.4860 | 3.20 | | |
| *10 | −7.5136 | 1.30 | 1.53389 | 56.0 |
| *11 | −5.8209 | D11 | | |
| 12 | ∞ | 0.80 | 1.51680 | 64.2 |
| 13 | ∞ | 4.37 | | |

*Aspherical Surface

TABLE 20

Reference Example: Data Related to Zoom

| Item | Wide Angle End | Telephoto End |
|---|---|---|
| f | 6.99 | 17.47 |
| Fno. | 3.57 | 5.07 |
| 2ω | 65.35 | 26.17 |
| D4 | 17.80 | 1.41 |
| D9 | 6.19 | 14.29 |

TABLE 21

Reference Example: Aspherical Surface Coefficients

| | Surface Number | | |
|---|---|---|---|
| | 1 | 2 | 4 |
| KA | −6.5246128 | 1.1753467 | 0.1896476 |
| RA3 | 2.1753256E−03 | −1.4374931E−04 | 4.9949966E−04 |
| RA4 | −5.0233123E−05 | 2.6918169E−03 | −1.2370956E−03 |
| RA5 | 1.1550662E−04 | −1.1085672E−03 | 4.7641589E−04 |
| RA6 | 1.9752856E−05 | 4.0624634E−04 | −1.2808558E−04 |
| RA7 | −1.5735537E−05 | −6.9213693E−05 | 2.6493645E−06 |
| RA8 | −1.4825844E−06 | −2.3909837E−06 | 3.9754126E−06 |
| RA9 | 7.9394952E−07 | 6.3736327E−07 | −1.6496994E−07 |
| RA10 | 1.6266512E−08 | 7.2019073E−08 | −4.7225015E−08 |
| RA11 | −1.9478766E−08 | 1.9206186E−08 | −1.0791993E−08 |
| RA12 | 1.3490981E−09 | −4.4753317E−09 | 1.8876735E−09 |

| | Surface Number | | |
|---|---|---|---|
| | 6 | 8 | 9 |
| KA | −4.4008071 | −10.0000090 | −0.9467370 |
| RA3 | −7.6144913E−04 | 2.2656131E−03 | 2.5357441E−03 |
| RA4 | 4.4710883E−03 | −1.2110217E−03 | 1.2641697E−03 |
| RA5 | −1.2683588E−03 | 9.2357964E−04 | 4.0339811E−04 |
| RA6 | 2.8192170E−04 | −4.1778708E−04 | −5.0079466E−04 |
| RA7 | 3.4217433E−05 | −1.2988020E−04 | −4.7093289E−05 |
| RA8 | −8.8454335E−06 | 1.4932293E−05 | 2.5311923E−05 |
| RA9 | −1.2293803E−05 | 3.7622799E−05 | 1.9891596E−05 |
| RA10 | 2.8898884E−06 | −7.6935620E−06 | −2.3117641E−06 |

| | Surface Number | |
|---|---|---|
| | 10 | 11 |
| KA | −8.4426033E−01 | −1.8542240E+00 |
| RA3 | 1.5440065E−03 | 1.3983137E−03 |
| RA4 | −2.5233087E−05 | −1.4888061E−03 |
| RA5 | −4.4135171E−04 | −7.1038752E−05 |

TABLE 21-continued

Reference Example: Aspherical Surface Coefficients

| | | |
|---|---|---|
| RA6 | −1.9709597E−05 | −1.9435177E−05 |
| RA7 | −2.6293343E−05 | −2.6551403E−05 |
| RA8 | −1.3411018E−03 | −3.1071543E−06 |
| RA9 | −1.1768451E−06 | 1.7923437E−06 |
| RA10 | 5.0873750E−06 | 1.3555762E−06 |

TABLE 22

Example 8: Basic Lens Data

| Si (Surface Number) | Ri (Radius of Curvature) | Di (Distance) | Ndj (Refractive Index) | νdj (Abbe's Number) |
|---|---|---|---|---|
| *1 | 89.0412 | 1.14 | 1.59522 | 67.7 |
| *2 | 5.6000 | 1.92 | | |
| *3 | 6.9445 | 1.80 | 1.60596 | 26.9 |
| *4 | 9.7843 | D4 | | |
| 5 | ∞ (Aperture Stop) | 0.40 | | |
| *6 | 8.2676 | 2.88 | 1.53389 | 56.0 |
| 7 | −7.2287 | 0.15 | | |
| *8 | −14.8886 | 0.80 | 1.60596 | 26.9 |
| *9 | 13.8953 | 2.40 | | |
| *10 | −8.9755 | 1.51 | 1.53389 | 56.0 |
| *11 | −6.0245 | D11 | | |
| 12 | ∞ | 0.80 | 1.51680 | 64.2 |
| 13 | ∞ | 4.97 | | |

*Aspherical Surface

TABLE 23

Example 8: Data Related to Zoom

| Item | Wide Angle End | Telephoto End |
|---|---|---|
| f | 6.92 | 19.55 |
| Fno. | 4.03 | 6.01 |
| 2ω | 65.20 | 23.25 |
| D4 | 20.00 | 2.34 |
| D11 | 9.15 | 20.45 |

TABLE 24

Example 8: Aspherical Surface Coefficients

| | Surface Number | | | |
|---|---|---|---|---|
| | 1 | 2 | 3 | 4 |
| KA | 5.8659949 | −0.3040606 | 0.3477393 | −0.0923975 |
| RA3 | 3.2038019E−03 | 3.6578206E−03 | 5.8483076E−04 | 2.2857991E−04 |
| RA4 | −1.2680863E−03 | −7.7828599E−05 | −8.9167948E−04 | −1.3285358E−03 |
| RA5 | 3.8282575E−04 | −3.4794665E−04 | 9.5732005E−05 | 4.4779145E−04 |
| RA6 | 1.6226224E−05 | 4.1047194E−04 | 1.7095370E−05 | −1.2116403E−04 |
| RA7 | −1.7888452E−05 | −7.6300252E−05 | 1.4726033E−06 | 7.3454795E−06 |
| RA8 | −1.5405798E−06 | −2.3623270E−06 | −2.9311208E−07 | 3.8148752E−06 |
| RA9 | 7.9768549E−07 | 8.2002958E−07 | −1.6039750E−07 | −3.8680122E−07 |
| RA10 | 2.0499233E−08 | 8.5622288E−08 | 1.7121841E−08 | −4.5399745E−08 |
| RA11 | −1.9204670E−08 | 1.6902689E−08 | 0.0000000E+00 | −8.9218504E−09 |
| RA12 | 1.2628738E−09 | −4.8050340E−09 | 0.0000000E+00 | 2.2960583E−09 |

| | Surface Number | | | | |
|---|---|---|---|---|---|
| | 6 | 8 | 9 | 10 | 11 |
| KA | −8.6923740 | −8.2418388 | −1.4860394 | −0.7810953 | −1.0871990 |
| RA3 | −6.4766296E−04 | 2.9578843E−03 | 2.8152170E−03 | 1.0290970E−04 | 1.6347395E−04 |
| RA4 | 2.9192191E−03 | −2.5531206E−03 | −2.7685836E−04 | 6.8474934E−04 | −1.0029084E−03 |
| RA5 | −1.2995461E−03 | 1.3064894E−03 | 6.4537093E−04 | −8.3033684E−04 | −1.8476704E−04 |
| RA6 | 2.7958968E−04 | −4.0876426E−04 | −5.2140997E−04 | −1.2507337E−05 | −1.6808265E−05 |
| RA7 | 2.4994553E−05 | −1.2329674E−04 | −5.5364172E−05 | −9.9761471E−06 | −2.0481165E−05 |
| RA8 | −9.6960148E−06 | 1.6709076E−05 | 2.9573736E−05 | −1.3221792E−05 | −4.0511230E−06 |
| RA9 | −1.1806812E−05 | 3.7957077E−05 | 1.8877105E−05 | −8.3556712E−07 | 2.2872897E−06 |
| RA10 | 3.0202421E−06 | −7.9786058E−06 | −2.0976265E−06 | 5.7191749E−06 | 1.1879115E−06 |

Table 25 shows values corresponding to Conditional Formulae (1) through (8) of the zoom lenses of Examples 1 through 6 and 8, as well as the reference example. The values in Table 25 are related to the d Line.

TABLE 25

Values Related to Conditional Formulae

| | Example 1 | Example 2 | Example 3 | Example 4 | Example 5 | Example 6 | Reference Example | Example 8 |
|---|---|---|---|---|---|---|---|---|
| (1) D2g/D1g | 1.29 | 1.59 | 1.20 | 1.55 | 1.58 | 1.22 | 1.28 | 1.58 |
| (2) D2/ft | 0.14 | 0.12 | 0.10 | 0.12 | 0.15 | 0.18 | 0.18 | 0.12 |

TABLE 25-continued

Values Related to Conditional Formulae

|  | Example 1 | Example 2 | Example 3 | Example 4 | Example 5 | Example 6 | Reference Example | Example 8 |
|---|---|---|---|---|---|---|---|---|
| (3) ft/|ft| | 1.43 | 1.32 | 1.21 | 1.36 | 1.63 | 1.15 | 1.11 | 1.34 |
| (4) ft/f2 | 1.46 | 1.49 | 1.31 | 1.53 | 1.83 | 1.35 | 1.44 | 1.51 |
| (5) fR/fW | 4.11 | 4.54 | 3.61 | 3.70 | 10.13 | 4.75 | 5.46 | 4.20 |
| (6) D12t/ft | 0.12 | 0.13 | 0.19 | 0.15 | 0.06 | 0.16 | 0.10 | 0.14 |
| (7) Nd2r | 1.53 | 1.53 | 1.49 | 1.53 | 1.53 | 1.53 | 1.53 | 1.53 |
| (8) vd2r | 56.0 | 56.0 | 57.5 | 56.0 | 56.0 | 56.0 | 56.0 | 56.0 |

The spherical aberration, the astigmatic aberration, the distortion, and the lateral chromatic aberration of the zoom lens of Example 1 at the wide angle end are illustrated in A through D of FIG. 9, respectively. The spherical aberration, the astigmatic aberration, the distortion, and the lateral chromatic aberration of the zoom lens of Example 1 at the telephoto end are illustrated in E through H of FIG. 9, respectively.

Each of the diagrams that illustrate the aberrations use the d line (wavelength: 587.6 nm) as a standard. However, in the diagrams that illustrate spherical aberration, aberrations related to wavelengths of 460.0 nm and 615.0 nm are also shown. In addition, the diagrams that illustrate lateral chromatic aberration also show aberrations related to wavelengths of 460.0 nm and 615.0 nm. In the diagrams that illustrate astigmatic aberrations, aberrations in the sagittal direction are indicated by solid lines, while aberrations in the tangential direction are indicated by broken lines. In the diagrams that illustrate spherical aberrations, "Fno." denotes F values. In the other diagrams that illustrate the aberrations, ω denotes half angles of view.

Similarly, the aberrations of the zoom lens of Example 2 are illustrated in A through H of FIG. 10. In addition, the aberrations of the zoom lenses of Examples 3 through 6 are illustrated in FIG. 11 through FIG. 14, the aberrations of the zoom lens of the reference example are illustrated in FIG. 15, and the aberrations of the zoom lens of Example 8 are illustrated in FIG. 16.

Next, an imaging apparatus according to an embodiment of the present invention will be described. FIG. 17 is a diagram that schematically illustrates an imaging apparatus 10 according to the embodiment of the present invention that employs the zoom lens 1 of the embodiment of the present invention. The imaging apparatus may be a surveillance camera, a video camera, an electronic still camera, or the like.

The imaging apparatus 10 illustrated in FIG. 17 is equipped with: the zoom lens 1; an imaging element 2 that captures images of subjects focused by the zoom lens 1, provided toward the image side of the zoom lens 1; a signal processing section 4 that processes signals output from the imaging element 2; a magnification control section 5 that changes the magnification of the zoom lens 1; and a focus control section 6 that performs focus adjustments. Note that various filters and the like may be provided between the zoom lens 1 and the imaging element 2 as appropriate.

The zoom lens 1 has the first lens group G1 having a negative refractive power and the second lens group G2 having a positive refractive power, provided in this order from the object side. The distance between the first lens group G1 and the second lens group G2 changes when changing magnification. Focusing operations are performed by moving the image side partial second lens group (the fifth lens L23 in the example described previously) that constitutes the second lens group along the optical axis. Note that the lens groups are schematically illustrated in FIG. 17.

The imaging element 2 captures an optical image formed by the zoom lens 1 and outputs electrical signals. The imaging surface thereof is provided to match the imaging plane of the zoom lens 1. A CCD, a CMOS, or the like may be employed as the imaging element 2.

Note that although not illustrated in FIG. 17, the imaging apparatus 10 may be further equipped with a blur correcting mechanism that moves a lens having a positive refractive power that constitutes a portion of the second lens group G2 in a direction perpendicular to the optical axis Z in order to correct blurring of obtained images due to vibration or shaky hands.

The imaging apparatus 10 is equipped with the zoom lens 1 of the present invention that exhibits the advantageous effects described above. Therefore, favorable optical performance, miniaturization, and high speed focusing operations can be realized.

The present invention has been described with reference to the embodiments and Examples thereof. However, the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples, and may be other values.

What is claimed is:

1. A zoom lens, consisting of:
a first lens group having a negative refractive power; and
a second lens group having a positive refractive power, provided in this order from an object side;
the second lens group practically comprising an object side partial second lens group having a positive refractive power and an image side partial second lens group having a positive refractive power;
the distance between the first lens group and the second lens group changing when changing magnification;
focusing being performed by moving the image side partial second lens group along an optical axis; and
the zoom lens satisfying the following conditional formulae:

$$1.0 < D2g/D1g < 1.6 \quad (1)$$

$$0.08 < D2t/ft < 0.19 \quad (2)$$

$$1.15 \leq ft/|f1| < 1.8 \quad (3)$$

$$1.1 < ft/f2 < 1.9 \quad (4)$$

wherein D1g is the distance from the surface of a lens most toward the object side to the surface of a lens most toward the image side within the first lens group, D2g and D2t are the distance from the surface of a lens most toward the object side to the surface of a lens most toward the image side within the second lens group and the distance between the object side partial second lens group and the image side partial second lens group along the optical axis when focused on infinity at a telephoto end, respectively, ft is the focal length of the entire system at the telephoto end, and f1 and f2 are the focal lengths of the first lens group and the second lens group, respectively.

2. A zoom lens as defined in claim 1 that satisfies the following conditional formula:

$$1.1<D2g/D1g<1.6 \tag{1'}$$

3. A zoom lens as defined in claim 1, wherein:
the object side partial second lens group practically comprises a first second lens group lens having a positive refractive power and a second second lens group lens having a negative refractive power; and
the image side partial second lens group practically comprises a third second lens group lens having a positive refractive power.

4. A zoom lens as defined in claim 1 that satisfies at least one of the following conditional formulae:

$$1.15 \le ft/|f1|<1.7 \tag{3'}$$

$$1.2<ft/f2<1.9 \tag{4'}$$

5. A zoom lens as defined in claim 1 that satisfies the following conditional formula:

$$3.9<fR/fw<5.5 \tag{5}$$

wherein fR is the focal length of the image side second partial lens group, and fw is the focal length of the entire system at the wide angle end.

6. A zoom lens as defined in claim 5 that satisfies the following conditional formula:

$$4.0<fR/fw<5.5 \tag{5'}$$

7. A zoom lens as defined in claim 1 that satisfies the following conditional formula:

$$0.05<D12t/ft<0.22 \tag{6}$$

wherein D12t is the distance along the optical axis between the surface of a lens in the first lens group most toward the image side and the surface of a lens in the second lens group most toward the object side at the telephoto end, and ft is the focal length of the entire system at the telephoto end.

8. A zoom lens as defined in claim 7 that satisfies the following conditional formula:

$$0.05<D12t/ft<0.20 \tag{6'}$$

9. A zoom lens as defined in claim 1, wherein:
the image side partial second lens group is constituted by one plastic lens having a positive refractive power; and
the one plastic lens satisfies the following conditional formulae:

$$1.48<Nd2r<1.56 \tag{7}$$

$$50<vd2r \tag{8}$$

wherein Nd2r and vd2r are the refractive index of the plastic lens with respect to the d line and the Abbe's number of the plastic lens with respect to the d line, respectively.

10. A zoom lens as defined in claim 9 that satisfies at least one of the following conditional formulae:

$$1.48<Nd2r<1.55 \tag{7'}$$

$$52<vd2r \tag{8'}$$

11. An imaging apparatus comprising a zoom lens as defined in claim 1.

* * * * *